United States Patent
Hirota

(10) Patent No.: US 10,983,772 B2
(45) Date of Patent: Apr. 20, 2021

(54) METHOD, APPARATUS AND PROGRAM FOR GENERATING APPLICATION PROGRAM

(71) Applicant: OMRON Corporation, Kyoto (JP)

(72) Inventor: Takuya Hirota, Takatsuki (JP)

(73) Assignee: OMRON Corporation, Kyoto (JP)

( * ) Notice: Subject to any disclaimer, the term of this patent is extended or adjusted under 35 U.S.C. 154(b) by 169 days.

(21) Appl. No.: 16/190,172

(22) Filed: Nov. 14, 2018

(65) Prior Publication Data

US 2019/0243624 A1 Aug. 8, 2019

(30) Foreign Application Priority Data

Feb. 7, 2018 (JP) .............................. JP2018-020210

(51) Int. Cl.
*G06F 8/41* (2018.01)
*G06F 9/48* (2006.01)

(52) U.S. Cl.
CPC ................ *G06F 8/44* (2013.01); *G06F 9/485* (2013.01)

(58) Field of Classification Search
CPC .................................. G06F 8/44; G06F 9/485
See application file for complete search history.

(56) References Cited

U.S. PATENT DOCUMENTS

| | | | | |
|---|---|---|---|---|
| 6,766,471 B2 * | 7/2004 | Meth | ................... | G06F 11/1469 714/15 |
| 7,047,519 B2 * | 5/2006 | Bates | ................... | G06F 11/362 714/34 |
| 7,082,519 B2 * | 7/2006 | Kelsey | ................... | G06F 1/324 712/228 |
| 7,188,337 B2 * | 3/2007 | Yoda | ................... | G06F 9/4825 712/233 |
| 7,366,950 B2 * | 4/2008 | Itoh | ................... | G06F 1/24 709/219 |
| 7,428,727 B2 * | 9/2008 | Alverson | ................... | G06F 11/362 714/34 |
| 7,882,488 B2 * | 2/2011 | Zeidman | ................... | G06F 8/30 717/106 |

(Continued)

FOREIGN PATENT DOCUMENTS

| | | |
|---|---|---|
| JP | 2006294010 | 10/2006 |
| JP | 2007328416 | 12/2007 |
| WO | 2015136973 | 9/2015 |

OTHER PUBLICATIONS

"Search Report of Europe Counterpart Application", dated May 17, 2019, p. 1-p. 12.

(Continued)

*Primary Examiner* — Douglas M Slachta
(74) *Attorney, Agent, or Firm* — JCIPRNET

(57) ABSTRACT

Provided is an environment for executing an application program included in a task to be periodically executed every fixed task cycle within a predetermined task cycle. A method includes: receiving input of a source code of the application program, and generating an execution module of the application program by adding, to the source code of the application program, a first command for interrupting the application program after executing the application program for a preset time within the task cycle and resuming execution of the application program in the next task cycle.

14 Claims, 17 Drawing Sheets

(56) References Cited

U.S. PATENT DOCUMENTS

| | | | | |
|---|---|---|---|---|
| 8,291,261 B2* | 10/2012 | Malleck | | G06F 9/485 |
| | | | | 714/15 |
| 8,370,493 B2* | 2/2013 | Sirota | | G06F 9/4806 |
| | | | | 709/226 |
| 8,418,181 B1* | 4/2013 | Sirota | | H04L 67/00 |
| | | | | 718/102 |
| 9,785,536 B2* | 10/2017 | Nistor | | G06F 8/30 |
| 10,353,826 B2* | 7/2019 | Beard | | G06F 9/4881 |
| 2005/0268301 A1* | 12/2005 | Kelley | | G06F 9/4843 |
| | | | | 718/100 |
| 2006/0020858 A1* | 1/2006 | Schaefer | | G06F 11/1482 |
| | | | | 714/38.1 |
| 2006/0136886 A1 | 6/2006 | Patterson et al. | | |
| 2007/0162785 A1* | 7/2007 | Downer | | G06F 1/24 |
| | | | | 714/15 |
| 2008/0209403 A1* | 8/2008 | Kimura | | G06F 11/3471 |
| | | | | 717/125 |
| 2011/0029958 A1* | 2/2011 | Kalra | | G06F 11/3644 |
| | | | | 717/129 |
| 2013/0036403 A1* | 2/2013 | Geist | | G06F 11/3636 |
| | | | | 717/125 |
| 2014/0089646 A1* | 3/2014 | Diewald | | G06F 9/3861 |
| | | | | 712/234 |
| 2014/0258985 A1* | 9/2014 | Yawn | | G06F 11/34 |
| | | | | 717/125 |
| 2016/0328308 A1* | 11/2016 | Pywell | | G06F 11/362 |
| 2017/0262309 A1 | 9/2017 | Crowther et al. | | |

OTHER PUBLICATIONS

André C. Nácul, et al., "Synthesis of Time-Constrained Multitasking Embedded Software," ACM Transactions on Design Automation of Electronic Systems, vol. 11, Oct. 2006, pp. 822-847.

"Office Action of Japan Counterpart Application" with English translation thereof, issued on Jan. 26, 2021, p. 1-p. 6.

* cited by examiner

```
VAR_IN_OUT
    z : ARRAY[*] OF WORD;
END_VAR
VAR
    head, tail: DINT;
    x, y : INT;
    temp : INT;
END_VAR head := UPPER_BOUND(z, 1);
tail := LOWER_BOUND(z, 1);
FOR x := head TO tail BY 1 DO
    FOR y := tail TO (head+1) BY -1 DO
        IF z[y-1] > z[y] THEN
            temp = z[y];
            z[y] = z[y - 1];
            z[y - 1]= temp;
        END
    END
END
```
⎱ 64

FIG. 2A

```
VAR_IN_OUT
    z : ARRAY[*] OF WORD;
END_VAR
VAR
    head, tail: DINT;
    x, y : INT;
    temp : INT;
    state : INT;
END_VAR SWITCH state DO
CASE 1:
    head := UPPER_BOUND(z, 1);
    tail := LOWER_BOUND(z, 1);
    x := 0;
    y := tail - 1;
    state := state + 1;
CASE 2:
    IF y <= head+1 THEN
        x := 0;
        y := y-1
    . .
    . .
```
⎱ 66-1
⎱ 66-2

FIG. 2B

```
VAR_IN_OUT
    z : ARRAY[*] OF WORD;
END_VAR
VAR
    head, tail: DINT;
    x, y : INT;
    temp : INT;
END_VAR head := UPPER_BOUND(z, 1);
tail := LOWER_BOUND(z, 1);

FOR x := head TO tail BY 1 DO
    FOR y := tail TO (head+1) BY -1 DO
        IF z[y-1] > z[y] THEN
            temp = z[y];
            z[y] = z[y - 1];
            z[y - 1]= temp;
        END
    END
END
```

FIG. 14A

```
VAR_IN_OUT
    z : ARRAY[*] OF WORD;
END_VAR
VAR
    head, tail: DINT;
    x, y : INT;
    temp : INT;
END_VAR head := UPPER_BOUND(z, 1);
tail := LOWER_BOUND(z, 1);
CHECK_POINT;                                   ⎫ 68

FOR x := head TO tail BY 1 DO
    FOR y := tail TO (head+1) BY -1 DO
        IF z[y-1] > z[y] THEN
            temp = x[y];
            z[y] = z[y - 1];
            z[y - 1]= temp;
        END
    END
END
CHECK_POINT;                                   ⎫ 68
END
```

FIG. 14B

```
VAR_IN_OUT
    z : ARRAY[*] OF WORD;
END_VAR
VAR
    head, tail: DINT;
    x, y : INT;
    temp : INT;
END_VAR head := UPPER_BOUND(z, 1);
tail := LOWER_BOUND(z, 1);
CHECK_POINT;                      ──68

FOR x := head TO tail BY 1 DO
    FOR y := tail TO (head+1) BY −1 DO
        IF z[y−1] > z[y] THEN  ⎫
            temp = x[y];       ⎪  No
            z[y] = z[y − 1];   ⎬  interruption
            z[y − 1]= temp;    ⎪  during update
        END                    ⎭  of y value
    END
    CHECK_POINT;             ──68
END
```

FIG. 15

METHOD, APPARATUS AND PROGRAM FOR GENERATING APPLICATION PROGRAM

CROSS-REFERENCE TO RELATED APPLICATION

This application claims the priority benefit of Japan Application No. 2018-020210, filed on Feb. 7, 2018. The entirety of the above-mentioned patent application is hereby incorporated by reference herein and made a part of this specification.

BACKGROUND

Technical Field

The disclosure relates to a method, an apparatus and a program for generating an application program included in a task to be periodically executed every fixed task cycle.

Related Art

Factory automation (FA) technology that uses a control apparatus such as a programmable logic controller (PLC) or the like is widely popular in various production sites. Along with development of information and communication technology (ICT) in recent years, in such a control apparatus in the FA field, not only conventional sequence programs but also various application programs are being executed.

Program execution in such a control apparatus is managed, for example, by allocation of resources and the like in units of tasks to be executed periodically. For example, WO 2015/136973 (Patent Document 1) discloses a control apparatus periodically executing at least two kinds of tasks. In the control apparatus disclosed in Patent Document 1, there is disclosed a technique for stabilizing and operating an apparatus even when execution time of any of the tasks fluctuates due to a modification to a program included in the task.

As described above, in a task to be periodically executed every fixed task cycle, there may be cases where program execution is not completed within the preset task cycle. Normally, when such a situation occurs, control performance such as responsiveness or the like may be degraded. Thus, a designer (programmer) of the control apparatus needs to create a program so that processing in each task cycle falls within the preset task cycle. In this case, a single program execution may also extend over a plurality of task cycles.

On the other hand, for example, an occasion is assumed where various application programs are created using an existing source code such as open source software or the like. In such a case, it is necessary to modify the source code so that the processing at each task cycle can be completed within the preset task cycle. However, such modification of the source code itself is troublesome, and there is a problem that labor is required for debugging or post changes and so on.

SUMMARY

According to an example of the disclosure, there is provided a method for generating an application program included in a task to be periodically executed every fixed task cycle. The method includes the following. Input of a source code of the application program is received. An execution module of the application program is generated by adding, to the source code of the application program, a first command for interrupting the application program after executing the application program for a preset time within the task cycle and resuming execution of the application program in the next task cycle.

According to another example of the disclosure, there is provided an apparatus for generating an application program included in a task to be periodically executed every fixed task cycle. The apparatus includes: a unit receiving input of a source code of the application program; and a unit generating an execution module of the application program by adding, to the source code of the application program, a first command for interrupting the application program after executing the application program for a preset time within the task cycle and resuming execution of the application program in the next task cycle.

According to still another example of the disclosure, there is provided a program stored on a non-transitory computer readable medium that causes a computer to generate an application program included in a task to be periodically executed every fixed task cycle. The program causing the computer to execute: receiving input of a source code of the application program; and generating an execution module of the application program by adding, to the source code of the application program, a first command for interrupting the application program after executing the application program for a preset time within the task cycle and resuming execution of the application program in the next task cycle.

BRIEF DESCRIPTION OF THE DRAWINGS

FIGS. 2A and 2B are diagrams for explaining an example of a design change that adds state management processing.

FIGS. 14A and 14B are diagrams for explaining insertion processing of an interruption point in the build processing according to the present embodiment.

FIG. 15 is a diagram for explaining arbitrary insertion of the interruption point in the division execution according to the present embodiment.

DESCRIPTION OF THE EMBODIMENTS

Figure 1A:
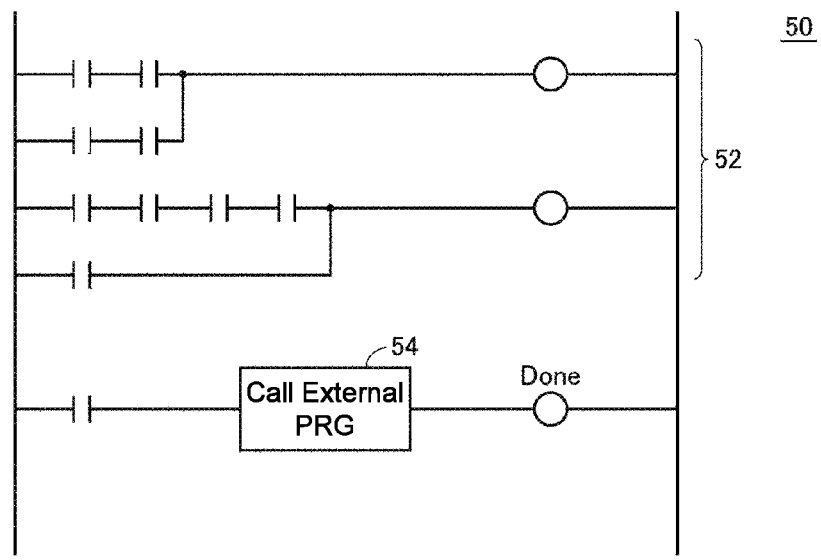
FIGS. 1A and 1B are schematic diagrams for explaining periodic execution of a user program in a general control apparatus.

The disclosure provides an environment for executing an application program included in a task to be periodically executed every fixed task cycle within a predetermined task cycle.

According to an example of the disclosure, there is provided a method for generating an application program included in a task to be periodically executed every fixed task cycle. The method includes the following. Input of a source code of the application program is received. An execution module of the application program is generated by adding, to the source code of the application program, a first command for interrupting the application program after executing the application program for a preset time within the task cycle and resuming execution of the application program in the next task cycle.

According to the disclosure, an embodiment can be provided in which, even in a case where an application program whose execution is not completed within a predetermined task cycle is registered as a task to be periodically executed, a single execution may extend over a plurality of task cycles while the execution is interrupted after the preset time within each task cycle. Since there is no need to manually change a source code of the application program and such execution over a plurality of task cycles can be realized, an arbitrary application program can be executed on a control apparatus, and the function of the control apparatus can be improved.

In an embodiment of the above disclosure, the first command includes a command to save an execution state at a moment when the preset time elapses from the start of execution of the application program and a command to restore the saved execution state.

According to the embodiment of the disclosure, regardless of the execution state of the application program, since the execution state at the moment when the preset time has elapsed is saved and the saved execution state can be restored in the subsequent task cycle, for an arbitrary application program, execution over a plurality of task cycles can be realized.

In an embodiment of the above disclosure, the first command further includes a command for setting an interrupt timer so as to generate an interrupt event when the preset time elapses from the start of execution of the application program.

According to the embodiment of the disclosure, by using the interrupt timer corresponding to the preset time, the time allocated to the application program can be accurately complied with.

In an embodiment of the above disclosure, the first command further includes a command to determine whether or not the preset time has elapsed at each interruption point preset in the source code of the application program.

According to the embodiment of the disclosure, even in a program execution environment where the interrupt timer or the like cannot be used, the time allocated to the application program can be accurately complied with.

In an embodiment of the above disclosure, the method further includes the following. The interruption point is inserted into the source code of the application program.

According to the embodiment of the disclosure, since the interruption point can be inserted into an arbitrary position according to time management accuracy or the like required for the source code of the application program, a requirement for the application program and the like can be flexibly responded to.

In an embodiment of the above disclosure, the step of generating the execution module generates the execution module including a first execution code and a second execution code. The first execution code is generated by adding the first command, and the second execution code is generated from the source code of the application program to which the first command is not added.

According to the embodiment of the disclosure, when the execution module is used as a program part, either of execution over a plurality of task cycles and normal execution can be flexibly selected.

In an embodiment of the above disclosure, the step of generating the execution module includes the following. The program definition information, in association with execution module is generated, including information indicating a state of an execution code included in the execution module.

According to the embodiment of the disclosure, when the execution module is used as a program part, by referring to the program definition information, the execution code or the like included in the execution module to be used can be reliably known, and user convenience and so on can be enhanced.

In an embodiment of the above disclosure, the step of generating the execution module includes the following. A second command for receiving setting of control parameters related to execution, interruption and resumption of the application program is further added to the source code of the application program.

According to the embodiment of the disclosure, when the execution module is used as a program part, by appropriately setting the control parameters, processing corresponding to the used application or the like can be easily realized.

In an embodiment of the above disclosure, the control parameters include information for selecting either to resume from a point where execution of the application program was interrupted or to execute the application program from the beginning.

According to the embodiment of the disclosure, it is possible to easily select between enabling and disabling of execution of an application program extending over a plurality of task cycles.

In an embodiment of the above disclosure, the method further includes the following. In a process of creating a user program referring to the execution module, whether or not to enable receipt of the setting of the control parameters is changed according to whether or not a function of interrupting the application program after executing the application program for the preset time within the task cycle is enabled.

According to the embodiment of the disclosure, in the case of using the execution module as the program part, a user can be provided with a user interface easier to understand according to whether to enable or disable the function.

According to the embodiments of the disclosure, an environment for executing an application program included in a task to be periodically executed every fixed task cycle within a predetermined task cycle can be provided.

Embodiments of the disclosure are explained in detail with reference to the drawings. Moreover, the same or equivalent parts in the drawings are denoted by the same reference numerals, and explanations thereof are not repeated.

A. Application Example

Figure 1B:
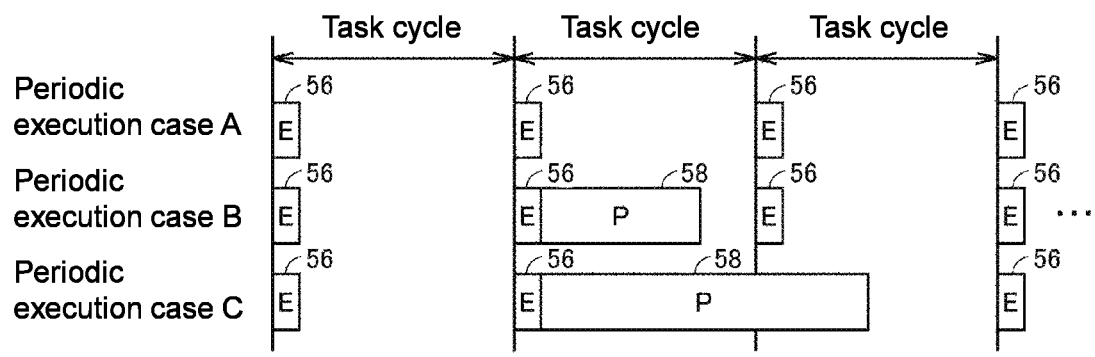

First of all, an example of a situation in which the disclosure is applied is explained. FIGS. 1A and 1B are schematic diagrams for explaining periodic execution of a user program in a general control apparatus. In the following explanation, it is assumed that a programmable logic controller (PLC) is mainly used as an example of the control apparatus.

FIG. 1A shows an example of a user program 50 executed in the control apparatus. In this specification, "user program" is a term used to distinguish it from "system program." A "user program" is a combination of commands arbitrarily created according to a control object, and can be arbitrarily created and modified by a designer of the control apparatus. In contrast, a "system program" is a program for realizing an execution environment for executing a "user program" or control of hardware included in the control apparatus. Basically, the "system program" is pre-installed in the control apparatus.

The user program 50 shown in FIG. 1A typically includes a source code composed of one or a plurality of commands described in accordance with the international standard IEC61131-3 defined by the International Electrotechnical Commission (IEC). The user program 50 is registered as part of any task, and is repeatedly executed every task cycle which is a control cycle set for the task. That is, in a certain task cycle, the user program 50 is sequentially executed from the beginning to the end; in the next task cycle, the user program 50 is also sequentially executed from the beginning to the end. Repetition of such sequential execution of the user program 50 from the beginning to the end every predetermined task cycle is referred to as "periodic execution." The task cycle may be defined as an integral multiple of a minimum cycle (hereinafter also referred to as "control cycle") in which periodic execution can be achieved in the control apparatus.

A task control program (also referred to as a "scheduler") executed in the control apparatus repeatedly executes a program included in each task every preset task cycle.

The user program 50 shown in FIG. 1A includes a sequence command group 52, and a function block 54 for executing an external program (external PRG). When a predetermined execution condition is met, the function block 54 calls and executes a designated program. Hereinafter, the program called within a certain task is also referred to as an "application program" for the sake of convenience. The application program according to the present embodiment is included in a task to be periodically executed every fixed task cycle, along with a sequence command or the like.

FIG. 1B shows an example of a time chart showing execution timing of the user program 50 shown in FIG. 1A. Case A of periodic execution shown in FIG. 1B corresponds to a case where the execution condition of the function block 54 included in the user program 50 is not met. In Case A, it is clear that execution (processing time 56) of the user program 50 is completed within a preset task cycle.

Case B of periodic execution shown in FIG. 1B shows a case where the execution condition of the function block 54 included in the user program 50 is met in the second task cycle. In Case B, processing time 58 required for executing the application program called by the function block 54 is added to the processing time 56 of Case A. In Case B, since the sum of the processing time 56 and the processing time 58 falls within the task cycle, the periodic execution is appropriately achieved.

Similarly to Case B, Case C of periodic execution shown in FIG. 1B shows a case where the execution condition of the function block 54 included in the user program 50 is met in the second task cycle. In Case C, the processing time 58 required for executing the application program called by the function block 54 is longer than the task cycle, and execution of the user program 50 cannot be completed within the preset task cycle. As shown in Case C, the state in which the time required for a single task execution does not fall within the preset task cycle is also referred to as "cycle exceeding."

In the control apparatus in which one or a plurality of tasks are periodically executed, it is necessary to avoid occurrence of such cycle exceeding. In order to avoid the occurrence of such cycle exceeding, the designer of the control apparatus needs to create an application program associated with each task so that processing can be completed within the set task cycle.

However, there are also cases where the processing provided by the application program cannot be completed within one task cycle. In such cases, the application program must be created so that processing can be divided into a plurality of cycles and gradually proceeded with. In the following explanation, an application program whose single execution extends over a plurality of task cycles is also referred to as a "divided executed program." As a typical method of generating such a divided executed program, a design is made so as to add state management processing for managing which command is to be executed every cycle. Hereinafter, an example of a procedure from design to programming is explained.

FIGS. 2A and 2B are diagrams for explaining an example of a design change that adds state management processing. FIG. 2A shows an example of a source code 60 of a general bubble sort program. FIG. 2B shows an example of a source code 62 obtained by adding the state management processing to the source code shown in FIG. 2A. Due to space limitations, FIG. 2B only shows a part of the source code corresponding to the source code 60 in FIG. 2A.

A loop processing command group 64 in the source code 60 shown in FIG. 2A is divided into command groups 66-1, 66-2 and so on by using a CASE statement included in the source code 62 of FIG. 2B. By incrementing a state (variable state) used in the CASE statement in each task cycle, each of the command groups 66-1, 66-2 and so on divided by using the CASE statement is sequentially executed every task cycle. By using such state management processing, the processing of the application program is divided and executed.

On the other hand, as clear from the source code 62 shown in FIG. 2B, by adding the state management processing, the number of steps is greatly increased, and the source code becomes difficult to understand for people other than the programmer of the source code 62 and deteriorates in debugging and maintainability.

Next, an example of execution performance of the divided and executed application program as shown in FIG. 2B is explained.

Figure 3:
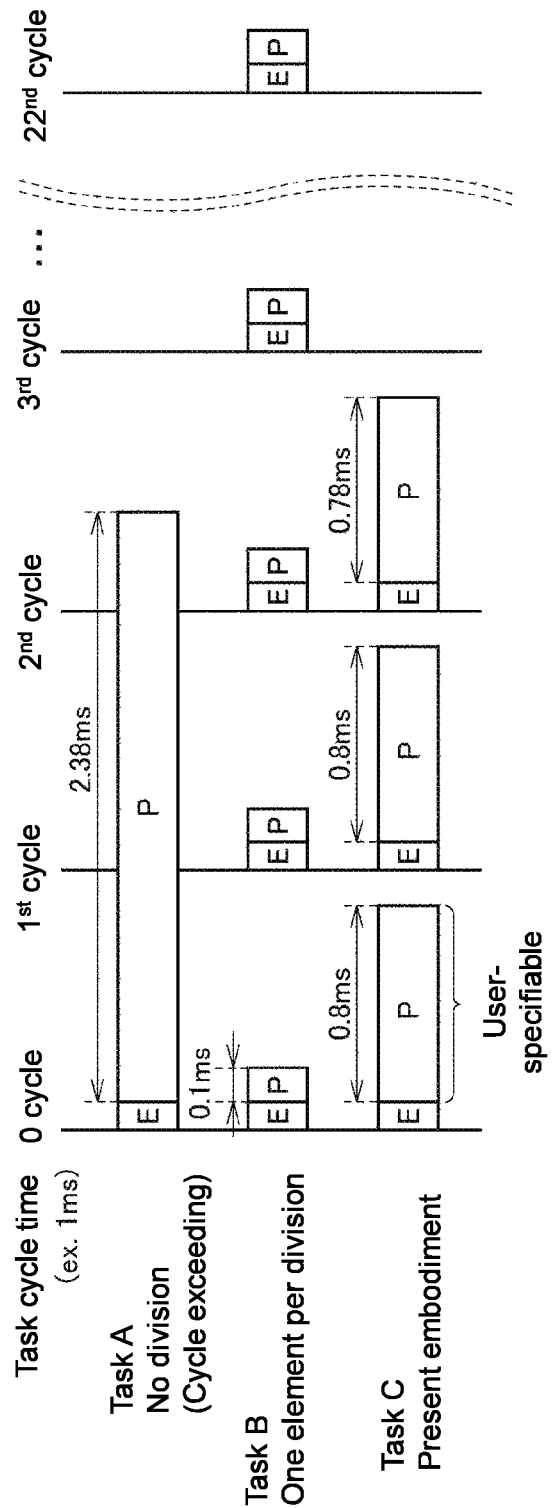
FIG. 3 is a time chart showing an example of execution performance of a divided and executed application program shown in FIG. 2B.

FIG. 3 is a time chart showing an example of execution performance of the divided and executed application program shown in FIG. 2B. In FIG. 3, "P" indicates time required for executing the application program called within a task (as an example, it is assumed that 100 μs are required for processing one element); "E" indicates time required for executing other processing to be executed within the task (it is assumed that 80 μs are required for each cycle).

FIG. 3 shows an example of a case of processing twenty-three elements in a task having a task cycle of 1 ms.

Task A shown in FIG. 3 shows a case where a source code which is not divided and executed, as shown in FIG. 2A, is executed. Since it takes 2.38 ms (=80 μs+100 μs×23) to execute Task A once, cycle exceeding may occur.

Task B shown in FIG. 3 shows a case where execution of the application program is divided and executed so as to process one element per task cycle as shown in FIG. 2B. According to Task B, to call the application program and execute the entire processing of the application program once, time corresponding to twenty-three cycles is required, and the application program needs to be divided and executed (changed in design).

In the example shown in FIG. 3, an example of processing twenty-three elements is shown. However, the number of elements to be processed by the application program is often not fixed. Examples of such cases include where measurement data from a sensor connected to the control apparatus or arbitrary data transferred to a built-in storage is to be processed, where the data of such a processing object is huge itself, and where the amount of input data fluctuates due to processing timing and the like. Hence, it is difficult to estimate in advance how many task cycles are required for the divided and executed application program, and design of the entire system may become complex.

In addition, the divided and executed application program is difficult to design and has a large implementation amount, and it is also difficult to adjust the processing time according to use. Therefore, the designer of the control apparatus may not want to adopt the method of division execution when possible.

With respect to the problem as described above, the present embodiment provides an environment where an application program requiring a plurality of task cycles for a single processing execution can be divided and executed for a user set time each time. For the designer of the control apparatus, a change such as to add state management processing is not required to realize such division execution.

For example, Task C in FIG. 3 shows a processing example according to the present embodiment. Task C shown in FIG. 3 shows a case where execution time of the application program is set to 0.8 ms. In other words, the user such as a programmer can realize the execution such as Task C shown in FIG. 3 simply by designating the application program to be divided and setting the time allocated for division execution.

In Task C shown in FIG. 3, by executing processing corresponding to 0.8 ms in each of the first two cycles, and executing processing corresponding to 0.7 ms in the final cycle, a single execution of the application program is completed.

As is described later, basically, the user may arbitrarily set only the time allocated for division execution in each task cycle, and the time can be freely set according to execution purpose or required specifications of each task.

In this specification, the "divided executed program" includes a program to be executed over a plurality of task cycles according to the situation. In some cases, execution may be completed within one task cycle. The "divided executed program" in this specification may also include such a program.

Likewise, in this specification, "division execution" means a state in which a certain program is executed at preset time intervals; in reality, execution does not necessarily have to extend over a plurality of task cycles. That is, for a program whose required time for execution fluctuates according to the situation, even in the case where the program is processed by "division execution," the processing may be completed within one task cycle. The term "division execution" does not require that an execution result of such a real program extend over a plurality of task cycles.

In the present embodiment, as typical examples, the following are assumed: (1) an aspect of automatically converting an arbitrary application program into a form (hereinafter sometimes referred to as "division execution type" or "division execution type program") in which the division execution as described above is possible; and (2) an aspect of distributing a generated division execution type program in some way and using the distributed division execution type program as a program part.

The aspect (1) corresponds to division execution processing of an application program. Typically, when a support apparatus converts (hereinafter also referred to as "builds") the application program from an arbitrary source program into an executable code or the like, the application program is automatically changed to a form in which execution of processing can be interrupted when a user set time elapses and can be resumed in the next task cycle. By utilizing such a function of the support apparatus, the division execution type program can be automatically generated without the user explicitly programming the execution/interruption/resumption procedures of processing.

In this way, the aspect (1) is directed to a method, an apparatus and a program for generating an application program included in a task to be periodically executed every fixed task cycle.

In the aspect (2), the division execution type program generated in the above aspect (1) can be reused as a program part as part of an arbitrary program. In the case of reuse, enabling/disabling of division execution (i.e., execution over a plurality of cycles) may be arbitrarily selected. The mode of providing a program in a form that can be reused as such a program part can be applied to, for example, various libraries or add-on programs and so on.

More detailed embodiments including each aspect are explained.

B. Overall Configuration Example of Control System

First of all, an overall configuration example of a control system 1 including a control apparatus 100 according to the present embodiment is explained.

Figure 4:
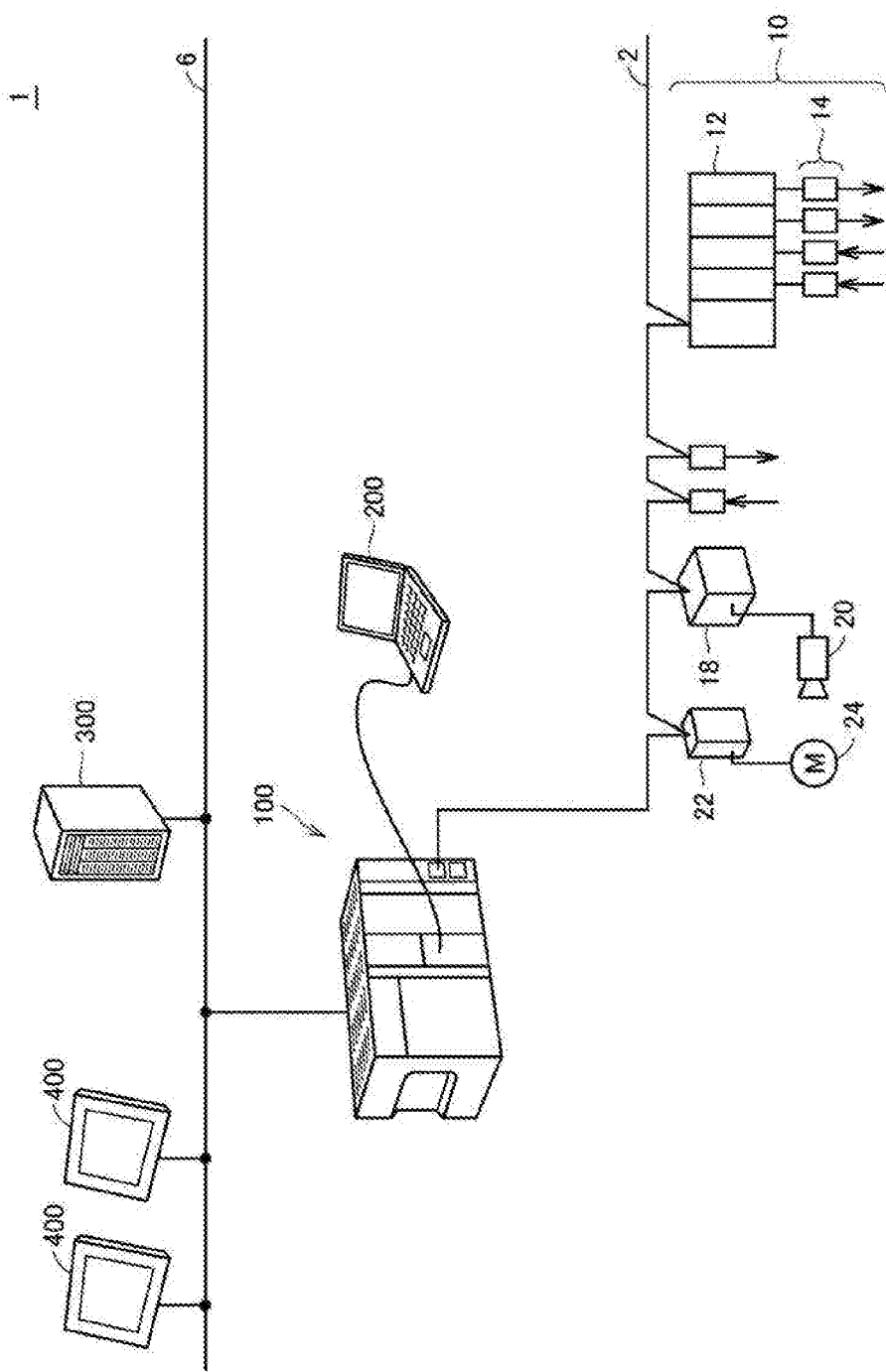
FIG. 4 is a schematic diagram showing an overall configuration example of a control system according to the present embodiment.

FIG. 4 is a schematic diagram showing the overall configuration example of the control system 1 according to the present embodiment. Referring to FIG. 4, the control apparatus 100 as a main component of the control system 1 controls an arbitrary control object by executing a user program prepared in advance. More specifically, the control apparatus 100 cyclically executes a series of control processing, namely, collecting measured values or state values (hereinafter also referred to as "input data") from the control object, executing a control operation based on the collected input data, and outputting, to the control object, command values or state values (hereinafter also referred to as "output data") obtained by executing the control operation.

FIG. 4 shows a configuration example in which the control apparatus 100 is connected to one or a plurality of devices 10 via a field network 2. The device or devices 10 control the control object in accordance with the output data from the control apparatus 100 and provide the input data measured from the control object to the control apparatus 100. As an example, the device 10 includes a remote input/output (I/O) device 12, a relay group 14, an image sensor 18 and a camera 20, a servo driver 22 and a servomotor 24.

The remote I/O device 12 includes a communication part communicating via the field network 2, and an input/output part (hereinafter also referred to as "I/O unit") for acquiring the input data and outputting the output data.

The I/O unit may be directly connected to the field network or may be incorporated as part of the control apparatus 100.

The image sensor 18 performs image measurement processing such as pattern matching or the like on image data captured by the camera 20, and transmits a result of the processing to the control apparatus 100. The servo driver 22 drives the servo motor 24 in accordance with the output data (e.g., a position command, etc.) from the control apparatus 100.

For the field network 2, a network in which data arrival time is guaranteed and fixed-cycle communication is performed is adopted. Known examples of such a network in which fixed-cycle communication is performed include EtherCAT (registered trademark), EtherNet/IP (registered trademark), DeviceNet (registered trademark), CompoNet (registered trademark) and so on.

A support apparatus 200 for developing or debugging a user program may be connected to the control apparatus 100. Details of functions provided by the support apparatus 200 are described later.

The control apparatus 100 is connected to a server apparatus 300 and a display apparatus 400 via a higher-level network 6.

The server apparatus 300 exchanges necessary data with the control apparatus 100. The server apparatus 300 has, for example, a database function and may collect event logs or the like outputted by the control apparatus 100 in time series.

The display apparatus 400 receives an operation from the user and transmits a command or the like corresponding to the user operation to the control apparatus 100, and graphically displays a computation result or the like in control apparatus 100.

C. Hardware Configuration Examples of Apparatuses

Next, hardware configuration examples of the main apparatuses constituting the control system 1 according to the present embodiment are explained.

(c1: Hardware Configuration Example of Control Apparatus 100)

Figure 5:
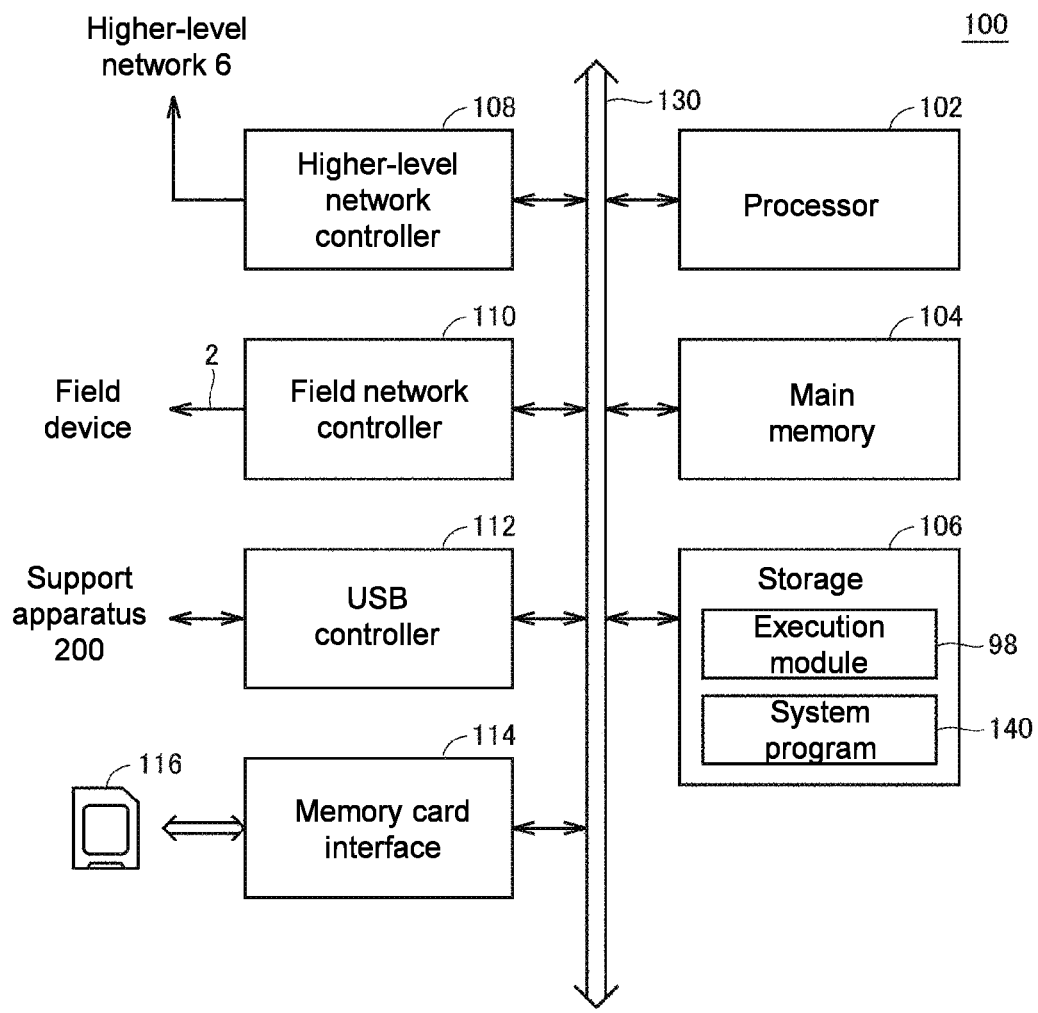
FIG. 5 is a circuit block diagram showing a hardware configuration example of a control apparatus constituting the control system according to the present embodiment.

FIG. 5 is a circuit block diagram showing a hardware configuration example of the control apparatus 100 constituting the control system 1 according to the present embodiment. Referring to FIG. 5, the control apparatus 100 includes a processor 102, a main memory 104, a storage 106, a higher-level network controller 108, a field network controller 110, a Universal Serial Bus (USB) controller 112, and a memory card interface 114. These components are connected via a processor bus 130.

The processor 102 is equivalent to an arithmetic processing part executing a control operation and the like, and is composed of a central processing unit (CPU) or a graphics processing unit (GPU) and the like. Specifically, the processor 102 reads a program stored in the storage 106, develops the program in the main memory 104 and executes the program, thereby realizing control corresponding to the control object and various processing to be described later.

The main memory 104 is composed of a volatile memory device such as a dynamic random access memory (DRAM) or a static random access memory (SRAM) and the like. The storage 106 is composed of, for example, a nonvolatile memory device such as a hard disk drive (HDD) or a solid-state drive (SSD) and the like.

The storage 106 stores a system program 140 for realizing basic functions, and one or a plurality of execution modules 98 for realizing a user program, and so on.

The higher-level network controller 108 exchanges data with an arbitrary information processing apparatus such as the display apparatus 400 or a server apparatus 300 (see FIG. 4) via the higher-level network 6.

The field network controller 110 exchanges data with a field device via the field network 2. The field network controller 110 functions as a communication master for performing fixed-cycle communication via the field network 2.

The USB controller 112 exchanges data with the support apparatus 200 or the like via USB connection.

The memory card interface 114 receives a memory card 116 being an example of a removable recording medium. The memory card interface 114 can write data into the memory card 116 and read various data (logs or trace data, etc.) from the memory card 116.

FIG. 5 shows a configuration example in which necessary functions are provided by the processor 102 executing programs. However, some or all of these provided functions may be implemented using a dedicated hardware circuit (e.g., an application-specific integrated circuit (ASIC) or a field-programmable gate array (FPGA), etc.). Alternatively, a main part of the control apparatus 100 may be realized by using hardware (e.g., an industrial personal computer based on a general-purpose personal computer) in accordance with a generic architecture. In this case, a plurality of operating systems (OSs) having different uses are executed in parallel using a virtualization technique, and necessary applications may be executed on each OS. Furthermore, a configuration may be adopted in which functions such as display apparatus and support apparatus are integrated in the control apparatus 100.

(c2: Hardware Configuration Example of Support Apparatus 200)

As an example, the support apparatus 200 according to the present embodiment is realized by executing a program using hardware (e.g., a general-purpose personal computer) in accordance with a generic architecture.

Figure 6:
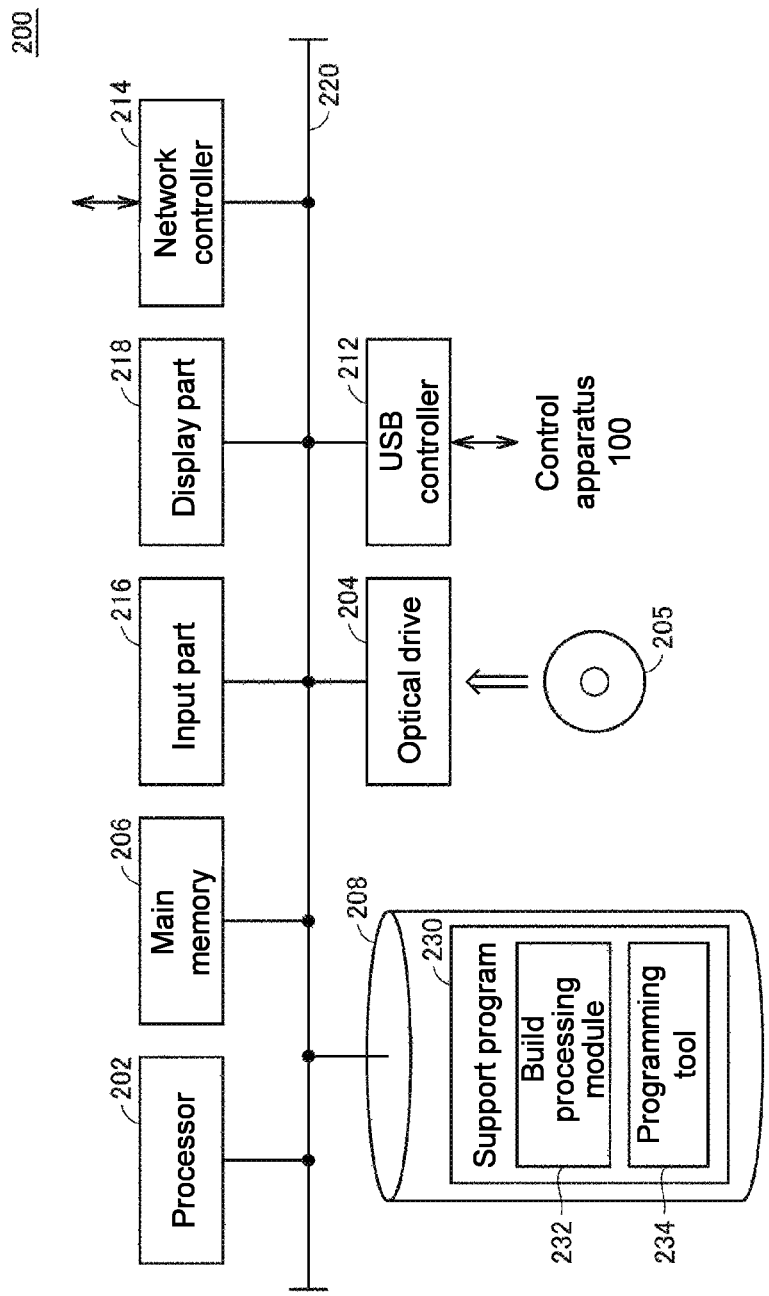
FIG. 6 is a circuit block diagram showing a hardware configuration example of a support apparatus constituting the control system according to the present embodiment.

FIG. 6 is a circuit block diagram showing a hardware configuration example of the support apparatus 200 constituting the control system 1 according to the present embodiment. Referring to FIG. 6, the support apparatus 200 includes a processor 202 such as a CPU or a microprocessor unit (MPU), an optical drive 204, a main memory 206, a storage 208, a USB controller 212, a network controller 214, an input part 216 and a display part 218. These components are connected via a bus 220.

The processor 202 reads various programs stored in the storage 208, develops the programs in the main memory 206 and executes the programs, thereby realizing various processing to be described later.

The storage 208 is composed of, for example, an HDD or an SSD and the like. Typically, the storage 208 stores a support program 230 for creating a user program to be executed in the support apparatus 200, debugging the created program, defining a system configuration, setting various parameters and the like.

The support program 230 causes the support apparatus 200, which is a computer, to function as an apparatus generating an application program. More specifically, the support program 230 includes a build processing module 232 for realizing build processing according to the present embodiment, and a programming tool 234 for realizing source code creation/editing processing and the like.

The support apparatus 200 has the optical drive 204, and a program stored in the recording medium 205 (e.g., an optical recording medium such as a digital versatile disc (DVD)) for non-transiently storing a computer-readable program is read from the recording medium 205 and installed in the storage 208 or the like.

Various programs to be executed in the support apparatus 200 may be installed via the computer-readable recording medium 205, and may also be installed in a form downloaded from a server apparatus or the like on a network. In addition, the function provided by the support apparatus 200 according to the present embodiment may also be realized in a form of using some of modules provided by an OS.

The USB controller 212 controls the data exchange with the control apparatus 100 via USB connection. The network controller 214 controls data exchange with other apparatuses via an arbitrary network.

The input part 216 is composed of a keyboard or a mouse and the like, and receives a user operation. The display part 218 is composed of a display, various indicators, a printer and the like, and outputs a processing result from the processor 202 and the like.

FIG. 6 shows a configuration example in which necessary functions are provided by the processor 202 executing programs. However, some or all of these provided functions may be implemented using a dedicated hardware circuit (e.g., an ASIC or an FPGA, etc.).

(c3: Hardware Configuration Example of Server Apparatus 300)

As an example, the server apparatus 300 constituting the control system 1 according to the present embodiment can be realized by using a general-purpose file server or database server. Since the hardware configuration of such an apparatus is well-known, a detailed explanation thereof will not be given herein.

(c4: Hardware Configuration Example of Display Apparatus 400)

The display apparatus 400 constituting the control system 1 according to the present embodiment is what is called an HMI (human-machine interaction) apparatus, may adopt a configuration implemented as a special-purpose machine or may be realized by using hardware (e.g., an industrial personal computer based on a general-purpose personal computer) in accordance with a generic architecture.

In the case of realizing the display apparatus 400 by using an industrial personal computer based on a general-purpose personal computer, a hardware configuration similar to that of the support apparatus 200 as shown in FIG. 6 described above is adopted. However, in the configuration example shown in FIG. 6, a program for realizing the HMI function is installed in place of the support program 230.

D. Embodiment 1: Division Execution of Application Program

Hereinafter, an aspect of dividing and executing an application program is explained. That is, a method of generating a division execution type program by conversion processing according to the present embodiment is explained.

(d1: Build Processing)

First of all, conversion processing (build processing) for dividing and executing an application program is explained. In the present specification, "build processing" means processing of converting a source code into a code (hereinafter also referred to as "execution code") in a form executable on the control apparatus 100, and typically includes processing such as parsing (lexical analysis and syntax analysis) of the source code, optimization, generation of an object code, and so on.

In the present embodiment, in the build processing that generates an execution code from a source code of an application program, the execution code can be generated so that processing is divided into a plurality of cycles and gradually proceeded with.

Figure 7:
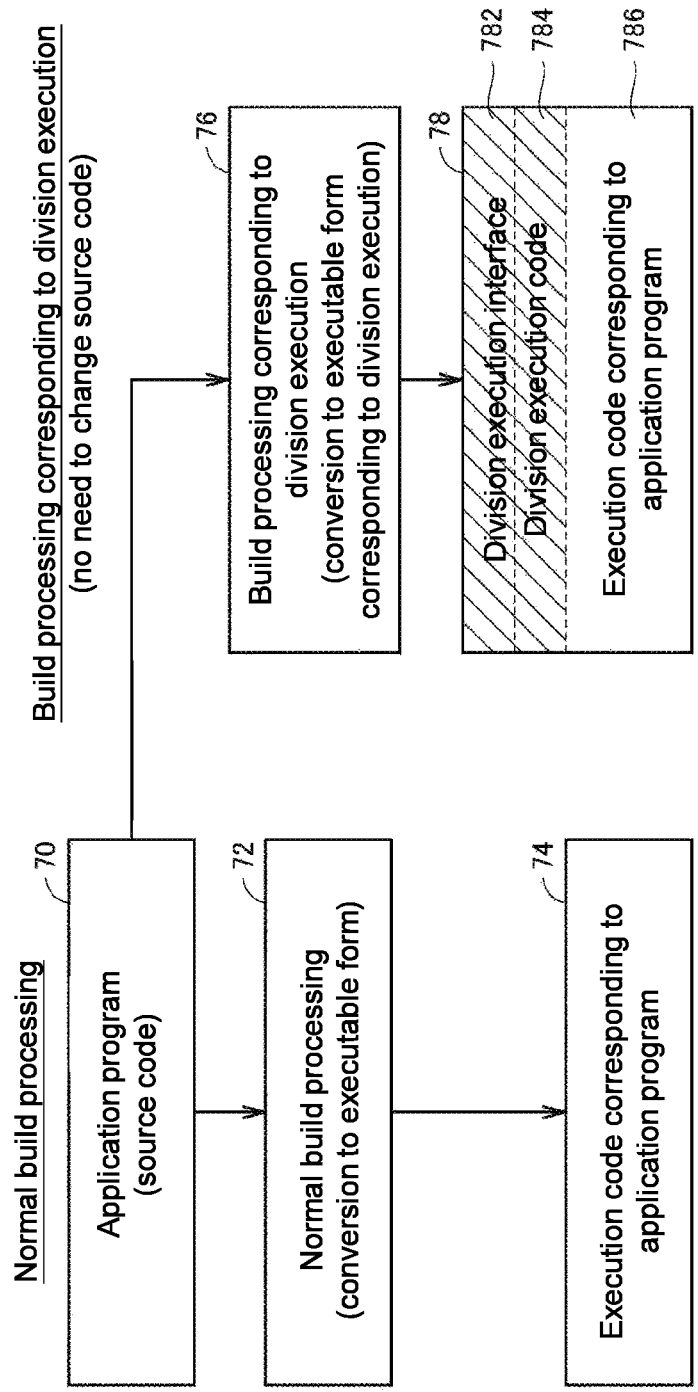
FIG. 7 is a flowchart showing a schematic procedure of build processing according to the present embodiment.

FIG. 7 is a flowchart showing a schematic procedure of the build processing according to the present embodiment. The processing shown in FIG. 7 is basically provided by the support apparatus 200. More specifically, in the support apparatus 200, by executing the support program 230 by the processor 202, the build processing is executed on an inputted source code of an application program.

Referring to FIG. 7, in normal build processing, when a source code 70 of an application program is inputted, normal build processing 72 that converts the source code 70 into an execution code to be executed in the control apparatus 100 is executed. Accordingly, an execution code 74 corresponding to the application program is generated.

In contrast, in the build processing corresponding to division execution, with respect to the inputted source code 70 of the application program, the user (designer or programmer) does not make any changes, and build processing 76 corresponding to division execution for generating the execution code so that processing can be divided into a plurality of cycles and gradually proceeded with is executed. In the build processing 76 corresponding to division execution, processing for conversion into a divided and executed execution code is executed. Accordingly, an execution code 78 of a divided and executed application program is generated.

The execution code 78 includes a division execution interface 782 for exchanging information for controlling division execution of an application, a division execution code 784 including a command required for division execution, and an execution code 786 corresponding to the application program.

The division execution interface 782 provides an environment for receiving settings required for division execution and outputting a state of division execution between a parent application or the like.

The division execution code 784 includes a command group for realizing processing (e.g., saving and restoring data on a memory, etc.) for interrupting and resuming program execution. More specifically, the division execution code 784 includes a command to save an execution state at a moment when a preset time (later-described "division time") elapses from the start of execution of the application program and a command to restore the saved execution state. Details of the processing to be realized by the division execution code 784 are described later.

The execution code 786 is basically the same as the execution code 74 generated by the normal build processing.

In this way, in the processing (build processing) converting the source code 70 of the application program into the execution code, the support apparatus 200 according to the present embodiment generates the execution code 78 of an application program corresponding to division execution, wherein the division execution interface 782 and the division execution code 784 are automatically incorporated into the execution code 78.

In the following explanation, that obtained by packaging one or a plurality of execution codes and necessary information is also referred to as an "execution module." "Execution module" means a state in which the execution code and information can be distributed or circulated as it is. The execution code 78 in FIG. 7 described above is also an example of an execution module.

The support apparatus 200 may be configured so as to arbitrarily select between the normal build processing and the build processing corresponding to division execution shown in FIG. 7 in accordance with an explicit setting from the user or a predetermined determination condition.

As shown in FIG. 7, the build processing according to the present embodiment includes processing of receiving input of the source code 70 of the application program, and processing of generating an execution module (execution code 78) of the application program by adding, to the source code 70 of the application program, a first command (division execution code 784) for interrupting the application program after executing the application program for a preset time within the task cycle and resuming execution of the application program in the next task cycle. In addition, the build processing according to the present embodiment also includes processing of adding, to the source code 70 of the application program, a second command (division execution interface 782) for receiving settings of control parameters related to execution, interruption and resumption of the application program.

(d2: Control Parameters and Division Execution Interface)

Next, parameters for controlling division execution and an example of a division execution interface for setting these parameters are explained.

In the present embodiment, (1) continuation flag, (2) division time, and (3) completion flag are used as the parameters for controlling division execution.

(1) The continuation flag sets whether to continue with processing by resuming from a point where execution of a target application program was interrupted immediately before, or to execute the processing on the target application program from the beginning. That is, (1) continuation flag is equivalent to information for selecting either to resume from the point where execution of the application program was interrupted or to execute the application program from the beginning. As a result, the continuation flag substantially sets enabling/disabling of division execution according to the present embodiment.

Figure 8A:
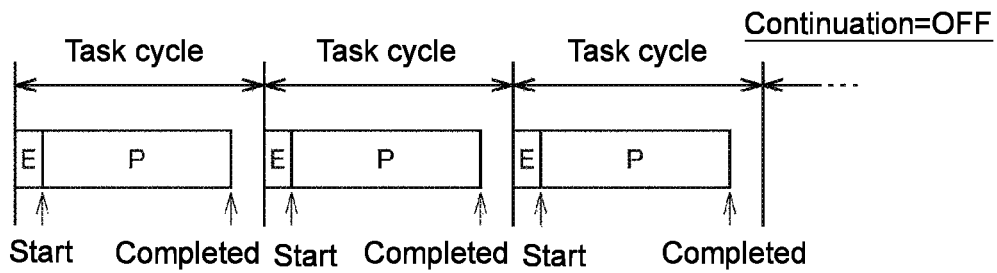
FIGS. 8A and 8B are diagrams for explaining a meaning of a continuation flag for controlling division execution according to the present embodiment.
Figure 8B:
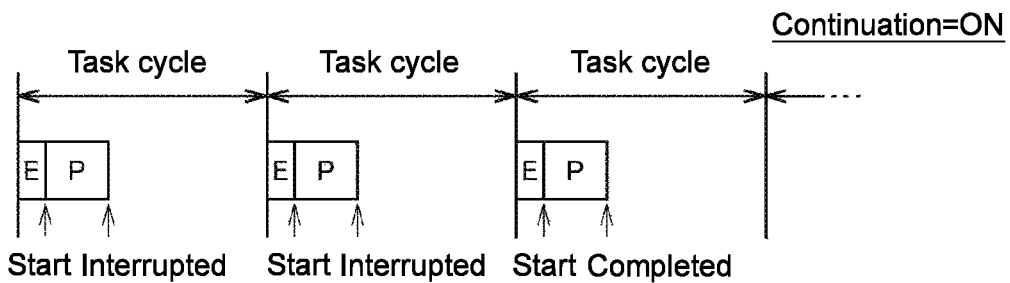

FIGS. 8A and 8B are diagrams for explaining a meaning of the continuation flag for controlling division execution according to the present embodiment. FIG. 8A shows an execution example of a program in a case where the continuation flag is set to OFF; FIG. 8B shows an execution example of a program in a case where the continuation flag is set to ON.

As shown in FIG. 8A, in the case where the continuation flag is set to OFF, processing of an application program (indicated by symbol "P" in FIGS. 8A and 8B) called within a task is started from the beginning every task cycle, and if all the processing can be executed within the task cycle, the completion is notified. Such execution of the application program from the beginning is repeated every task cycle.

In contrast, in the case where the continuation flag is set to ON, as shown in FIG. 8B, in an application program whose execution is started in a certain task cycle, when the execution is interrupted, the processing is resumed from a point where the interruption occurred in the next task cycle. In this way, by setting the continuation flag to ON, even if execution of processing of the application program is interrupted every task cycle, in the next task cycle, the processing is resumed from each point where the interruption occurred. By utilizing such a function of resuming and interrupting processing, a single execution of an application program can extend over a plurality of task cycles.

Next, (2) division time sets the time allocated for executing the application program in each task cycle. That is, the division time means the time from the start of execution of the application program to interruption thereof.

Figure 9A:
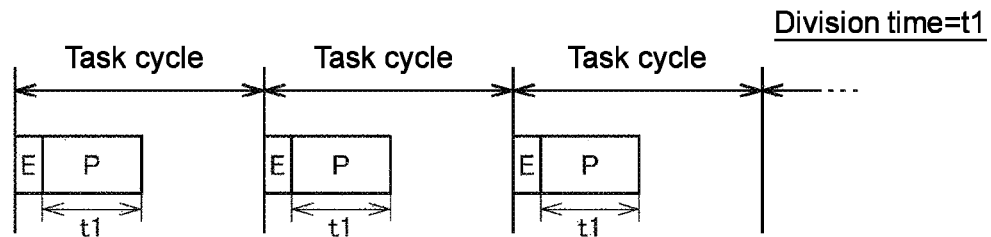
FIGS. 9A and 9B are diagrams for explaining a meaning of division time for controlling the division execution according to the present embodiment.
Figure 9B:
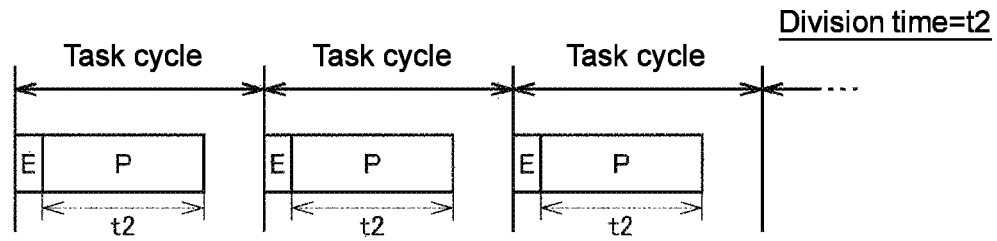

FIGS. 9A and 9B are diagrams for explaining a meaning of division time for controlling division execution according to the present embodiment. FIG. 9A shows an execution example of a program in a case where the division time is set to t1; FIG. 9B shows an execution example of a program in a case where the division time is set to t2 (>t1).

As shown in FIG. 9A, in the case where the division time is set to t1, in each task cycle, processing of the application program is executed for the set division time t1, and then the execution of the processing is interrupted. As shown in FIG. 9B, in the case where the division time is set to t2 longer than t1, in each task cycle, processing of the application program is executed for the set division time t2, and then the execution of the processing is interrupted.

In this way, the length of the division time can be arbitrarily adjusted in relation to other tasks and the like.

As a specification on implementation, for example, even if the division time is set to zero, instead of not executing the application program at all, minimal processing may be executed in each task cycle, and execution of the processing may be interrupted.

In addition, if the division time is set to "infinity," the execution of the application program may not be interrupted until completion (which is described later in detail). However, in this case, there is a possibility that cycle exceeding may occur.

(3) The completion flag notifies completion of execution of the application program. By referring to the completion flag, whether or not the execution of the target application program has been completed can be determined.

The division execution code 784 added to the execution code 78 of the divided and executed application program shown in FIG. 7 includes a variable for holding the control parameters as described above or a command for forming a memory region.

Herein, an example of the division execution interface 782 added to the execution code 78 of the divided and executed application program shown in FIG. 7 is explained.

Figure 10:
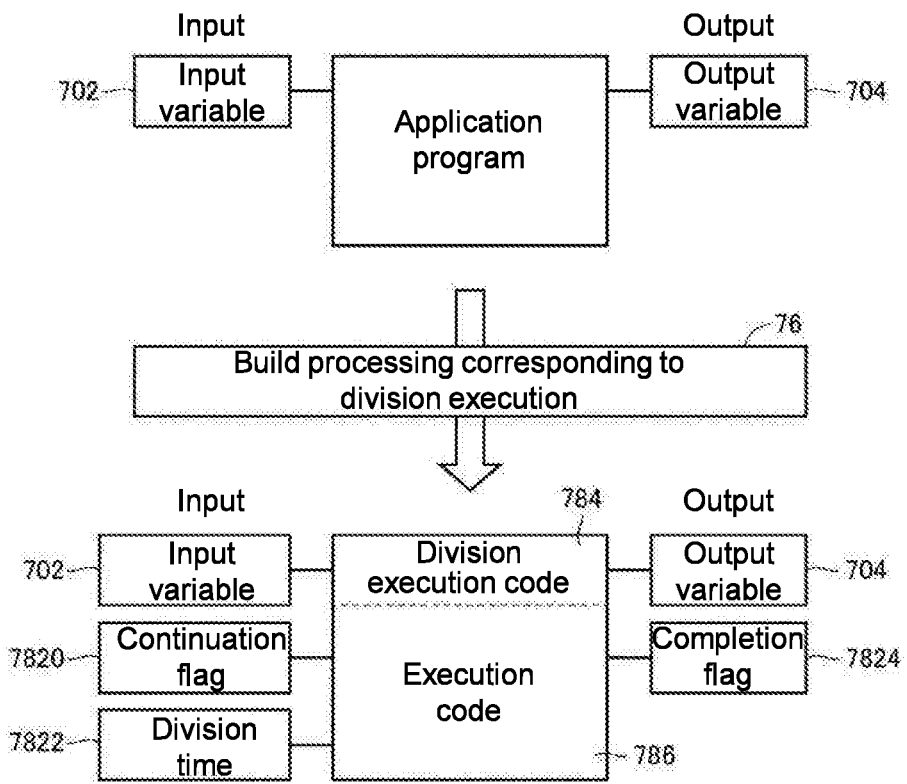
FIG. 10 is a diagram for explaining addition of a division execution interface in the build processing according to the present embodiment.

FIG. 10 is a diagram for explaining the addition of the division execution interface 782 in the build processing according to the present embodiment. FIG. 10 shows an example in which execution of an application program is designated in the form of a function block. In the example shown in FIG. 10, it is assumed that, upon execution of the application program, user-defined input variable 702 and output variable 704 are defined as input and output, respectively.

By the build processing corresponding to division execution, the execution code 786 corresponding to the application program is generated. At this moment, the division execution code 784 including the command required for division execution is added.

Furthermore, as the division execution interface 782, a continuation flag 7820 and a division time 7822 are added as input and a completion flag 7824 is added as output. That is, by the build processing according to the present embodiment, for function blocks or functions, flags and variables for exchanging the control parameters required for division execution are additionally allocated.

In the case of using such a function block within a program registered as a task, the continuation flag 7820, the division time 7822 and the completion flag 7824 can be assigned an arbitrary variable type (e.g., internal variable, external variable, system variable, etc.).

Figure 11:
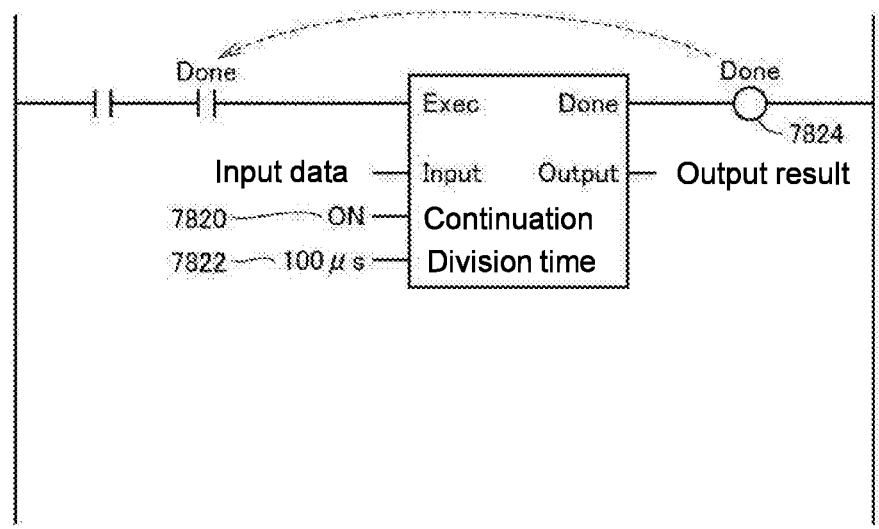
FIG. 11 is a diagram for explaining a use example of a function block generated by the build processing corresponding to division execution shown in FIG. 10.

FIG. 11 is a diagram for explaining an example of use of a function block generated by the build processing corresponding to division execution shown in FIG. 10. As shown in FIG. 11, when using a function block to which the division execution interface 782 (the continuation flag 7820, the division time 7822 and the completion flag 7824) is added, a variable indicating input data to be given to a corresponding application program and a variable storing an output result obtained as a result of processing execution in the corresponding application program are defined. In addition, a condition (Exec) instructing the execution of the corresponding application program is defined. The condition instructing the execution of the application program may include a value of the completion flag 7824. By defining such a condition, duplicate execution of the same application program during execution of the corresponding application program over a plurality of cycles can be prevented.

(d3: Interruption/Resumption of Processing)

Next, behaviors of the application program at the time of division execution according to the present embodiment are explained.

Figure 12:
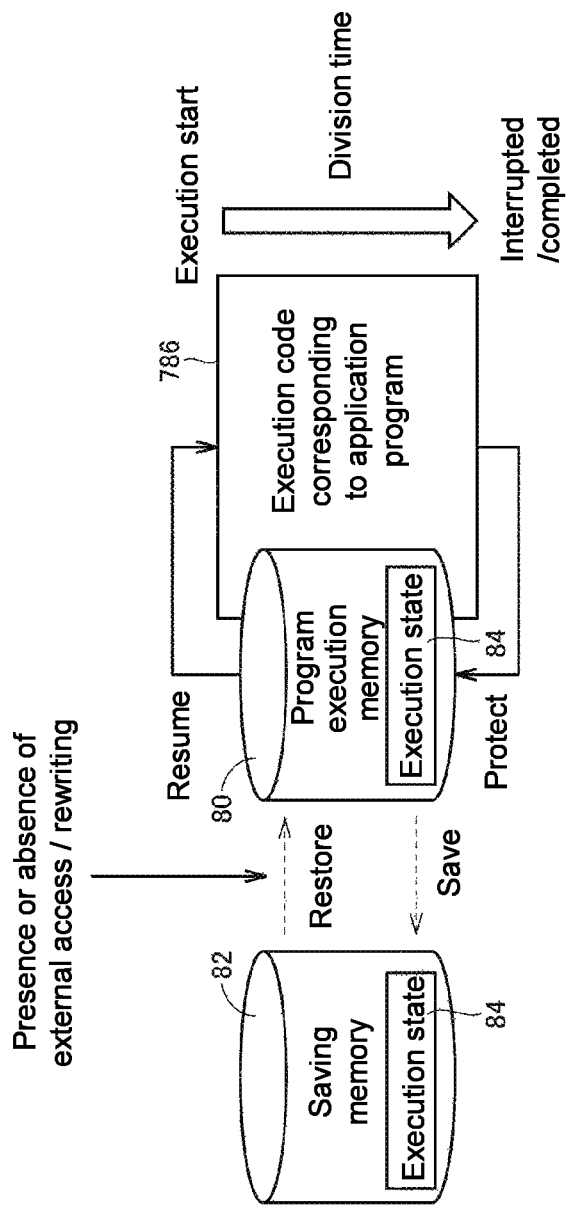
FIG. 12 is a diagram for explaining behaviors related to interruption/resumption of processing related to the division execution according to the present embodiment.

FIG. 12 is a diagram for explaining behaviors related to interruption/resumption of processing related to division execution according to the present embodiment. Referring to FIG. 12, when an execution start timing arrives in each task cycle, the execution code 786 corresponding to the application program is executed for a preset division time. If all the processing can be executed within the division time, the processing is completed. However, if not all the processing can be executed within the division time, the processing is temporarily interrupted. On this occasion, an execution state 84 at the moment of interruption is saved so that processing can be resumed subsequently. Then, when the processing is resumed, the saved execution state 84 is restored.

The execution state 84 typically includes a state value on the memory, such as execution position (command position) of the program, stack, variable information, register value and the like.

In order to minimize processing cost at interruption/resumption, as an example of a mode of saving the execution state 84, a memory area (program execution memory 80) that has been used by the application program at the time of interruption may be protected. That is, a change from outside the application program may be prohibited from being made to the memory area that has been used by the application program. By protecting such a memory area, when the application program is called again, the protected memory area can be reused as it is.

However, in cases such as where a change from outside the application program cannot be prohibited (i.e., where the content of the execution state 84 held by the program execution memory 80 cannot be protected), such as when there is a possibility that the memory area (program execution memory 80) may be used for another purpose until the application program is called again (resumption of processing), the execution state 84 is temporarily saved and stored in a saving memory 82 prepared separately from the program execution memory 80. Then, when the application program is called again (when processing is resumed), the saved execution state 84 may be restored to the program execution memory 80. By using the saving memory 82 different from the program execution memory 80, the execution state 84 can be reliably restored.

Such processing of saving the execution state 84 at the moment when a preset time (division time) elapses from the start of execution of the application program and processing of restoring the saved execution state 84 are realized by commands included in the division execution code 784.

(d4: Processing Procedure of Division Execution)

Figure 13B:
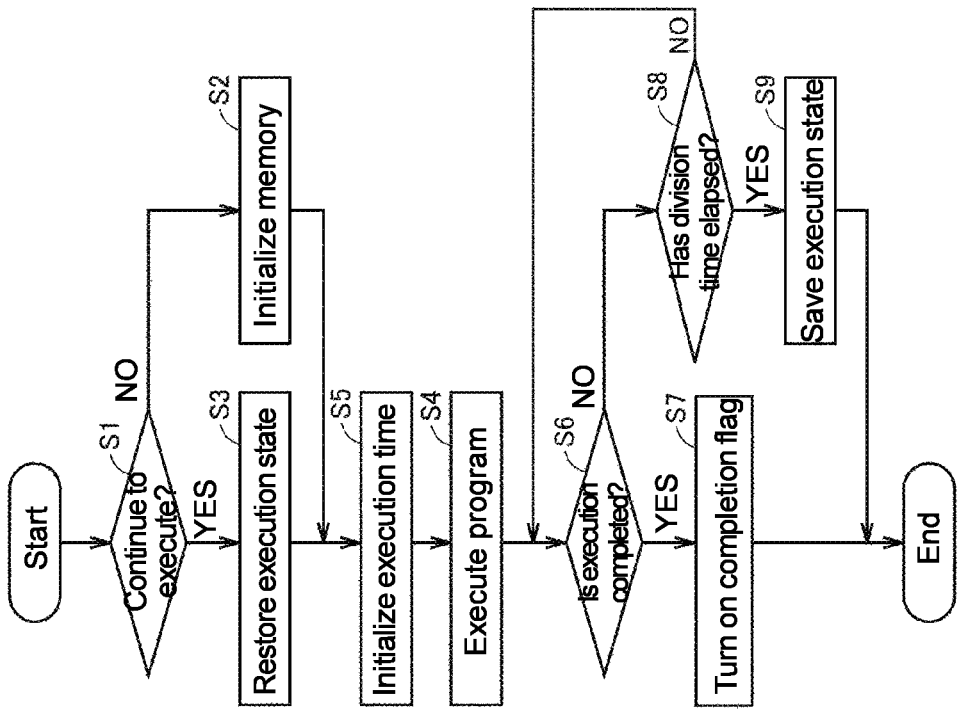
FIGS. 13A and 13B are flowcharts showing an example of a processing procedure of the division execution according to the present embodiment.
Figure 13A:
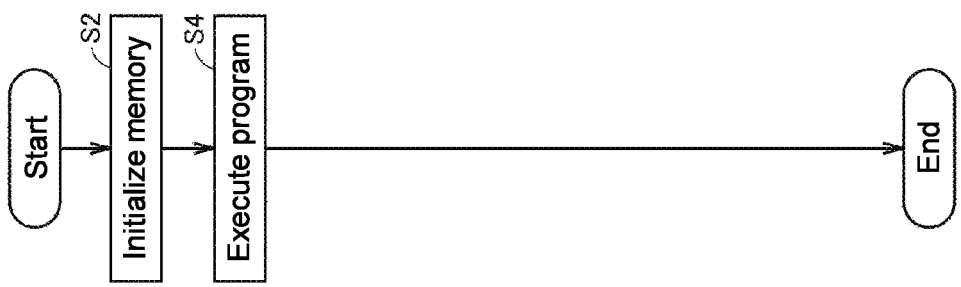

Next, a processing procedure of a divided and executed application program is explained. FIGS. 13A and 13B are flowcharts showing an example of a processing procedure of division execution according to the present embodiment. FIG. 13A shows the processing procedure in a case where division execution is disabled; FIG. 13B shows the processing procedure in a case where division execution is enabled.

First of all, referring to FIG. 13A, the processing procedure in the case where division execution is disabled is explained. When processing is started at arrival of a task cycle or the like, a memory is initialized (step S2), and an application program is executed (step S4). Then, when execution of all the commands included in the application program is completed, the processing is ended.

Such a processing procedure shown in FIG. 13A is the same as a processing procedure at the time of executing an application program which is not divided and executed.

Next, referring to FIG. 13B, the processing procedure in the case where division execution is enabled is explained. Among the processing included in FIG. 13B, the same processing as that in FIG. 13A is denoted by the same step number.

When processing is started at arrival of a task cycle or the like, first of all, whether or not a continuation flag is ON is determined (step S1). If the continuation flag is OFF (NO in step S1), the memory is initialized (step S2). In contrast, if the continuation flag is ON (YES in step S1), an execution state saved in the previous processing execution is restored (step S3). That is, the continuation flag is used to control whether or not to execute after initializing the application program.

After step S2 or step S3, execution time is initialized (step S5). The execution time means a measured value of execution duration of the application program; initialization of the execution time means resetting a timer or the like for measuring the execution duration. Then, the application program is executed (step S4).

Whether or not execution of all commands included in the application program has been completed is determined (step S6). If execution of all the commands has been completed (YES in step S6), the completion flag is set to ON (step S7), and the processing is ended.

On the other hand, if execution of all the commands included in the application program has not been completed (NO in step S6), whether or not a set division time has elapsed from the start of execution of the application program (step S8).

If the set division time has not elapsed from the start of execution of the application program (NO in step S8), the processing in and after step S6 is repeated. In contrast, if the set division time has elapsed from the start of execution of the application program (YES in step S8), it means that the time during which the application program can be executed in the task cycle has elapsed, the execution of processing is interrupted, and an execution state at the time of interruption is saved (step S9). Then, the processing in the task cycle is ended.

In this way, in the case where the division execution according to the present embodiment is enabled, if the execution is continuously ongoing, the processing is resumed from the previous interruption state, otherwise the processing is started from the initial state. In the case where the preset division time has elapsed, the execution state (execution position (command position) of the program, stack, variable information, register value, etc.) is saved. By saving such an execution state, interruption/resumption of processing can be flexibly realized.

(d5: Implementation Method 1 of Interruption of Processing: Timer Interrupt Method)

In the build processing according to the present embodiment, basically, with respect to the source code of the application program, processing can be interrupted at intervals of the set division time without any change by the user. An example of such an implementation method of interruption of processing is explained.

As a first plan of such an implementation method, an interrupt timer may be used to generate an interrupt event every time the preset division time arrives and to interrupt the execution of processing in response to the interrupt event.

More specifically, in the processing procedure shown in FIG. 13B described above, the interrupt timer is set at a value of the set division time. If execution of all the commands has been completed before the interrupt event from the set interrupt timer occurs, the completion flag is set to ON and the setting of the interrupt timer is discarded. On the other hand, if an interrupt event from the interrupt timer occurs before execution of the commands is completed, the execution state at that moment is saved.

The setting of such an interrupt timer is realized by a command included in the division execution code 784. That is, the division execution code 784 includes a command for setting the interrupt timer so as to generate an interrupt event when a preset time (division time) elapses from the start of execution of the application program.

Such a timer interrupt method is selected if it is determined that the interrupt timer can be used in an environment (such as cases where the interrupt timer is supported by hardware, an OS or interpreter execution system).

(d6: Implementation Method 2 of Interruption of Processing: Interruption Point Insertion Method)

In an environment where the timer interrupt method as described above cannot be used, an interruption point insertion method using a previously automatically inserted interruption point may be adopted.

The interruption point is equivalent to a position where whether or not the preset division time has elapsed from the start of processing is determined at the time of sequentially executing the commands included in the application program. That is, the commands included in the application program are sequentially executed, and whether or not the division time has elapsed is determined every time the interruption point is reached. In this way, interruption of processing of the application program is one of the inserted interruption points.

FIGS. 14A and 14B are diagrams for explaining insertion processing of an interruption point in build processing according to the present embodiment. FIG. 14A shows an example of the general source code 60 of a bubble sort program; FIG. 14B shows an example of a source code 61 obtained by inserting an interruption point 68 into the source code 60. In the source code shown in FIG. 14B, "CHECK POINT" is used as a keyword (command word) meaning the interruption point 68.

By inserting such interruption point 68 into an appropriate position in the source code in advance, whether or not to interrupt the processing is determined at each interruption point 68. Basically, the interruption point 68 is automatically inserted into the source code unless the user arbitrarily inserts the interruption point 68 as described later. The insertion of such interruption point 68 is realized by a command included in the division execution code 784. That is, the division execution code 784 includes a command to determine whether or not the preset time (division time) has elapsed at each interruption point 68 preset in the source code of the application program. In addition, the build processing according to the present embodiment includes processing of inserting the interruption point 68 into the source code of the application program.

In the interruption point insertion method, since processing cannot be interrupted from one interruption point 68 to the next interruption point 68, it is necessary to optimize the position (granularity) into which the interruption point 68 is inserted, so as to comply with the set division time. Also, from the viewpoint of minimizing the influence on performance due to an increase in code quantity and size of the execution module and processing jitter caused by inserting the interruption point 68, it is necessary to optimize the position and number of insertion of the interruption point 68.

Therefore, in the build processing, it is preferable to determine the insertion position of the interruption point 68 in accordance with the following procedure.

(1) Execution time of each command included in the source code is calculated with reference to an execution time table for each command.

(2) The required execution time is cumulatively added from the beginning of the source code or the position of the previous interruption point, and an interruption point is inserted immediately before a predetermined time is reached.

If the division time set in the build processing is known, the set division time may be used as the predetermined time as it is. On the other hand, if the set division time is not known until program execution (e.g., in an environment where the user can arbitrarily set the division time, etc.), minimum resolution of the division time set in the environment where the divided and executed application program is executed can be adopted as the predetermined time.

(d7: Arbitrary Setting of Interruption Point)

In the above-described interruption point insertion method, an example in which the interruption point is automatically inserted has been explained. However, the interruption point may be inserted into an arbitrary position or the position where the interruption point has been automatically inserted may be changed.

For example, a case is assumed where, among a series of processing executed in an application program, a specific processing section is intended not to be interrupted. In such a case, the user may explicitly designate a position of the interruption point. For example, in cases such as where it is necessary to continuously issue a plurality of communication commands in a series of communication processing, if the processing is interrupted in the middle, problems such as an improper state on the receiving side or timeout may occur. To avoid such situations, it can be set not to intentionally insert the interruption point in the section where processing is intended not to be interrupted.

FIG. 15 is a diagram for explaining arbitrary insertion of the interruption point in division execution according to the present embodiment. Similarly to FIG. 14B, FIG. 15 shows an example of the source code 61 of the general bubble sort program.

In the source code 61 shown in FIG. 15, the interruption point 68 is inserted into (1) after initial processing (after acquiring an array size) and (2) one operation unit (update of an x value) of the whole array, and is not inserted into an individual processing (update of a y value) section of an array element. As a result, processing is not interrupted during update of the y value, and all the y values with respect to a certain x value are updated by one-time processing.

The processing of inserting the interruption point into an arbitrary position is executed during the build processing. In the case where the above-described timer interrupt method is adopted, even when an interrupt event occurs, coding is performed so that the processing is continued until reaching the next interruption point.

On the other hand, in the case where the interruption point insertion method is adopted, since the interruption point is previously automatically inserted into the inputted source code, the user arbitrarily changes the automatically inserted interruption point if necessary. By inserting such an interruption point, the elapse of the division time (i.e., whether or not to interrupt) is determined only in a place where the interruption point is inserted.

By utilizing the function of arbitrarily setting the interruption point as described above, the occurrence of malfunctions due to interruption can be avoided for, for example, communication processing or processing in which a procedure is determined in advance.

E. Embodiment 2: Use of Division Execution Type Program as Program Part

Next, an example of using a division execution type program generated by the build processing according to the present embodiment as a program part such as a library or the like is explained.

(e1: Application Example)

For example, a form is assumed in which a program part provider such as a control apparatus manufacturer or a software vendor distributes an arbitrary application program as a division execution type program for a fee or free of charge, and a program part user such as a general user of the control apparatus or a system integrator creates an arbitrary user program incorporating the distributed division execution type program.

An arbitrary method can be adopted as a distribution form of the program part. For example, an execution code (or an execution module or a library) may be stored in a medium such as an optical disk and then distributed, or the execution code may be placed in a server or the like and then distributed in the form of download by access from an arbitrary information processing apparatus.

Furthermore, the execution code as the program part may not be distributed alone but may be distributed together with a source code or an execution code generated by performing build processing on a source code.

(e2: Discrimination of Division Execution Program)

In the divided and executed application program that is generated by the build processing according to the present embodiment, information for discriminating that it is a division execution type program is added in advance.

For example, when the division execution type program is generated by the build processing according to the present embodiment, program definition information indicating that it is a division execution type program may be added. That is, the build processing according to the present embodiment may include processing of generating the execution module in association with program definition information including information indicating a state of the execution code included in the execution module.

As a form of adding the program definition information, for example, the program definition information may be incorporated into a header file associated with the division execution type program or may be incorporated into the execution code of the division execution type program. The program definition information may be a unique identifier indicating that it is a division execution type program.

A programming tool for developing the user program discriminates whether or not it is a division execution type program during program editing or build processing based on presence or absence of a unique identifier associated with a designated application program. In the programming tool, since whether or not it is a division execution type program can be discriminated, an interface corresponding to the division execution type program as described later can be provided.

(e3: Distribution Form of Division Execution Program)

In the present embodiment, the divided executed program may be roughly distributed in any of the following forms, so that the program part user can arbitrarily select enabling/disabling of division execution.

(1) Distribution of Double Execution Codes (Performance Priority)

A program part including both a division execution-corresponding execution code generated by the build processing according to the present embodiment and an execution code generated by the normal build processing may be distributed. As a form of the program part, an execution module can be adopted. In this case, since addresses of entry points in the respective execution codes differ, when building a user program that uses the execution module, which execution module is to be used is designated. A link to the entry point of the execution module designated by the programming tool of the user program is generated.

(2) Distribution of Only Divided and Executed Execution Code (Size Priority)

An execution module only including the division execution-corresponding execution code generated by the build processing according to the present embodiment may be distributed. In a case of using the execution module distributed in this way by disabling division execution, by appropriately setting the control parameters at the time of calling when building the user program that uses the execution module, division execution is disabled and the execution module can be operated.

An identifier indicating which of the above-described forms the distributed program part is in may be included in the program definition information associated with the program part.

(e4: Distribution of Double Execution Codes)

Next, an example of a procedure for distributing double execution codes is explained.

Figure 16:
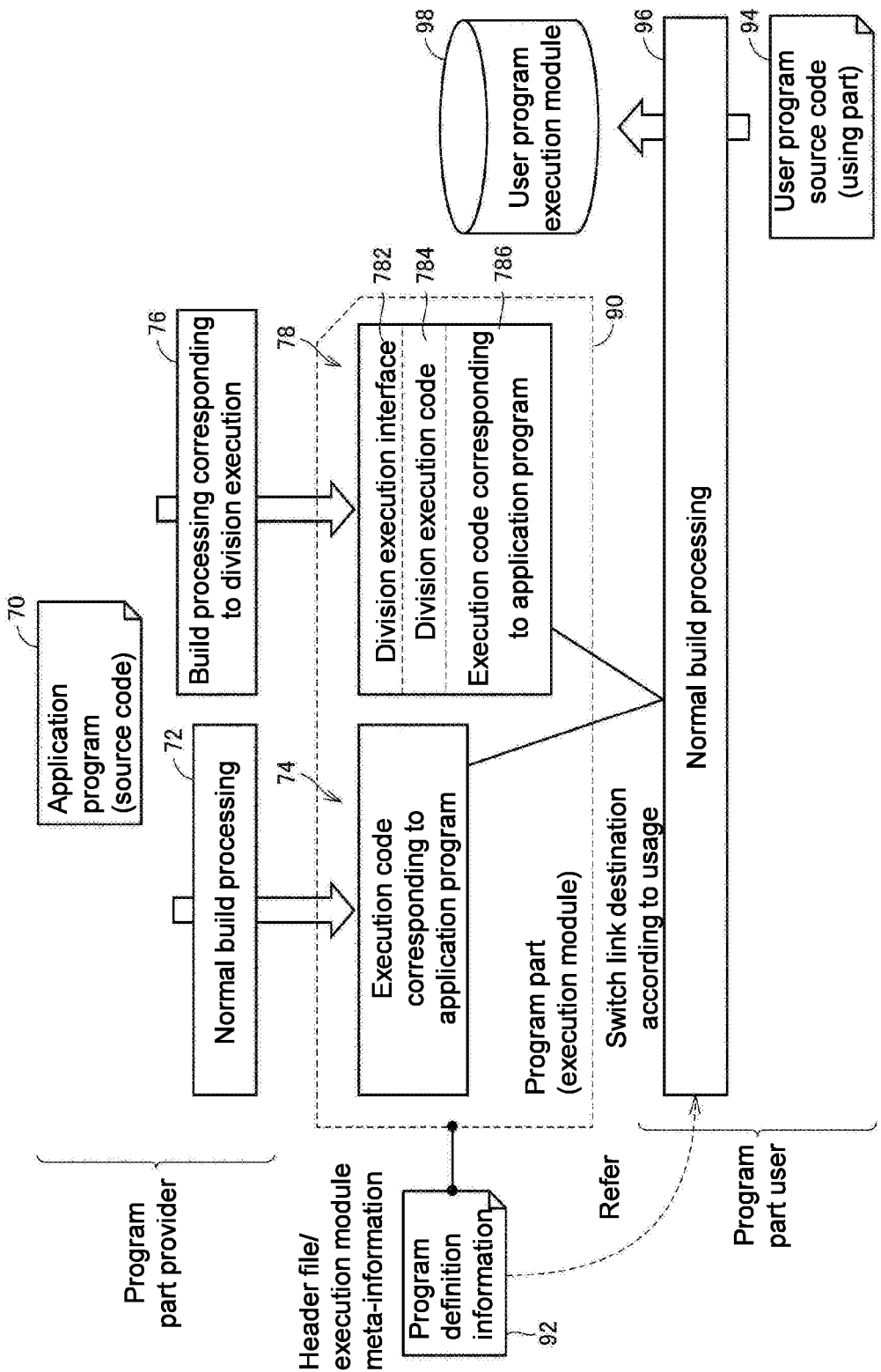
FIG. 16 is a diagram for explaining a procedure in a case of using an execution module including two kinds of execution codes generated by the build processing according to the present embodiment as a program part.

FIG. 16 is a diagram for explaining a procedure in a case of using an execution module including two kinds of execution codes generated by the build processing according to the present embodiment as a program part.

Referring to FIG. 16, firstly, by the program part provider executing the normal build processing 72 on the source code 70 of an arbitrary application program, the execution code 74 corresponding to the application program is generated. In parallel, by the program part provider executing the build processing 76 corresponding to division execution on the source code 70 of the same application program, the execution code 78 of the divided and executed application program is generated.

The execution code 78 includes the division execution interface 782 for exchanging information for controlling division execution of an application, the division execution code 784 including the command required for division execution, and the execution code 786 corresponding to the application program.

Furthermore, the program part provider generates an execution module 90 that integrates the execution code 74 corresponding to the application program with the execution code 78 of the divided and executed application program. Program definition information 92 including information indicating that the execution module 90 is a division execution type program and information indicating that two execution codes are included may be added to the execution module 90.

The execution module 90 and the associated program definition information 92 are provided as program parts to the program part user.

In this way, in the case of distributing double execution codes, the build processing according to the present embodiment generates the execution module 90 including the execution code 78 generated by adding the division execution code 784 including the command required for division execution, and the execution code 74 generated from the source code 70 of the application program to which the division execution code 784 is not added.

On the other hand, it is assumed that the program part user created a source code 94 of an arbitrary user program that uses the execution module 90. Then, the program part user operates a programming tool to generate the execution module 98 corresponding to the user program by executing normal build processing 96 on the created source code 94 of the user program. At this moment, within the user program, a code referring to the program definition information 92 is described, and which execution code included in the execution module 90 is to be used is designated. By such definition and designation in the source code 94 of the user program, which of the execution code 74 and the execution code 78 is to be used can be switched.

Figures 17A, 17B:
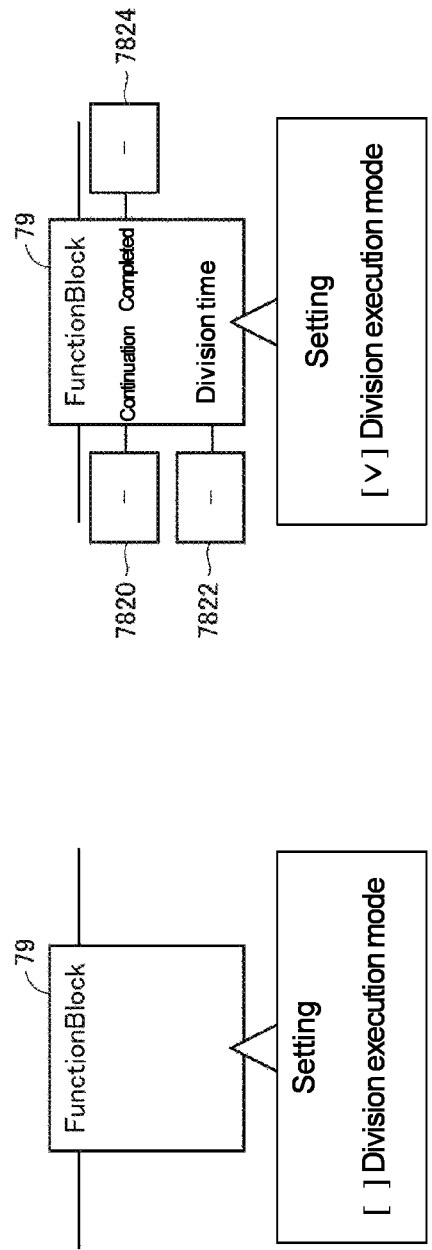
FIGS. 17A and 17B are diagrams for explaining an example of creating a user program in a case of using an execution module including double execution codes generated by the build processing according to the present embodiment.

FIGS. 17A and 17B are diagrams for explaining an example of creating a user program in a case of using an execution module including double execution codes generated by the build processing according to the present embodiment. FIGS. 17A and 17B show an example of designating the execution code in the form of a function block when creating the user program.

FIG. 17A shows a display example of a function block 79 in the case where division execution is disabled; FIG. 17B shows a display example of the function block 79 in the case where division execution is enabled.

As shown in FIG. 17A, in the case where division execution of the application program corresponding to the execution module 90 is disabled, input and output required for division execution are not displayed in the corresponding function block 79. On the other hand, as shown in FIG. 17B, in the case where division execution of the application program corresponding to the execution module 90 is enabled, the input and output (the continuation flag 7820, the division time 7822 and the completion flag 7824) required for division execution are displayed in the corresponding function block 79.

In this way, in the case of using a program part which is the execution module 90 including double execution codes, the user can arbitrarily select enabling/disabling of division execution, and a user interface for using the program part also changes according to the selection. Such display switching can be realized by referring to the program definition information 92 (see FIG. 16).

As shown in FIGS. 17A and 17B, in the present embodiment, in the process of creating the user program referring to the execution module 90, processing of changing whether or not to enable receipt of the setting of the control parameters is executed according to whether or not a function of interrupting the application program after executing the application program for the preset time within the task cycle is enabled.

In the present embodiment, when programming is performed by utilizing a divided and executed application in the form of a function block (or the form of a function), it is possible to arbitrarily select between a state in which division execution is disabled and a state in which division execution is enabled.

(e5: Distribution of Only Divided and Executed Execution Code)

Next, an example of a procedure for distributing only a divided and executed execution code is explained.

Figure 18:
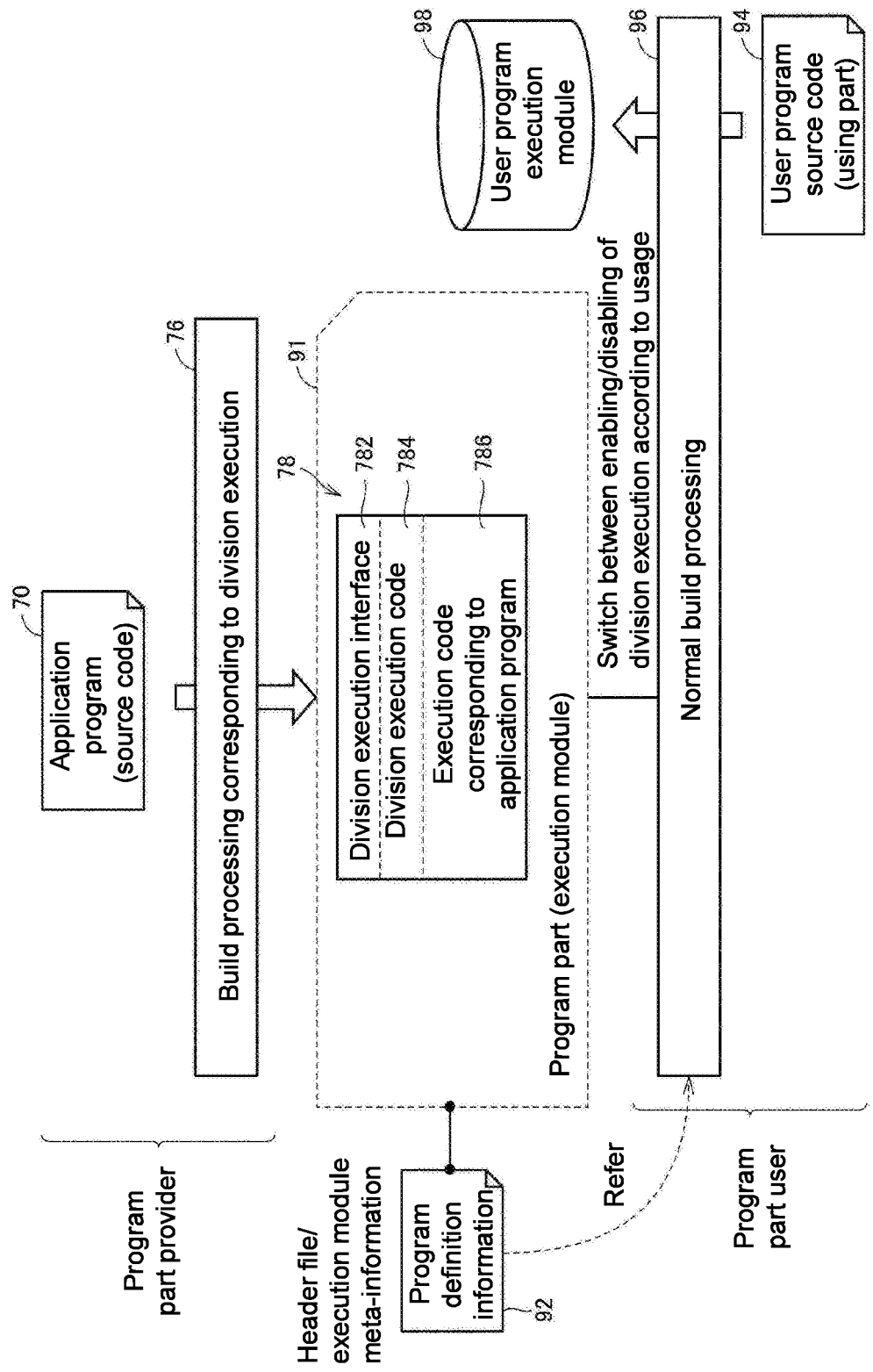
FIG. 18 is a diagram for explaining a procedure in a case of using an execution module only including an execution code generated by the build processing according to the present embodiment as a program part.

FIG. 18 is a diagram for explaining a procedure in a case of using an execution module only including an execution code generated by the build processing according to the present embodiment as a program part.

Referring to FIG. 18, firstly, the program part provider generates the execution code 78 of the divided and executed application program by executing the build processing 76 corresponding to division execution on the source code 70 of an arbitrary application program.

The execution code 78 includes the division execution interface 782 for exchanging information for controlling division execution of an application, the division execution code 784 including the command required for division execution, and the execution code 786 corresponding to the application program.

Furthermore, the program part provider generates an execution module 91 only including the execution code 78 of the divided and executed application program. The program definition information 92 including information indicating that the execution module 91 is a division execution type program and information indicating that only the execution code 78 of the divided and executed application program is included may be added to the execution module 91.

The execution module 91 and the associated program definition information 92 are provided as program parts to the program part user.

On the other hand, it is assumed that the program part user created the source code 94 of an arbitrary user program that uses the execution module 91. Then, the program part user operates a programming tool to generate the execution module 98 corresponding to the user program by executing the normal build processing 96 on the created source code 94 of the user program. At this moment, within the user program, a code referring to the program definition information 92 is described, and a method of using the execution code 78 included in the execution module 91 is designated according to usage. More specifically, the content of the source code 94 of the user program is appropriately changed according to whether to enable or disable division execution.

Figure 19:
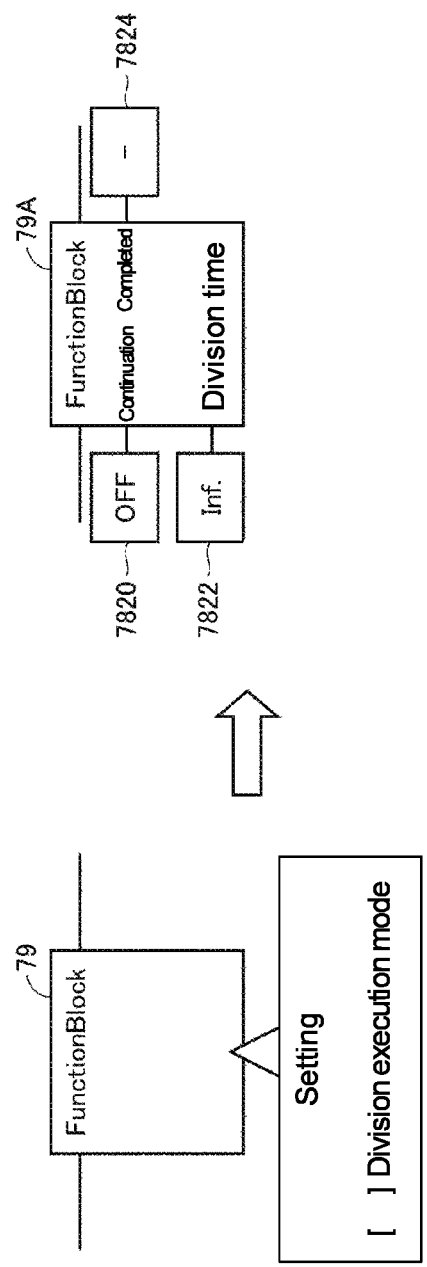
FIG. 19 is a diagram for explaining an example of creating a user program in a case of using an execution module only including a divided and executed execution code generated by the build processing according to the present embodiment.

FIG. 19 is a diagram for explaining an example of creating a user program in a case of using an execution module only including a divided and executed execution code generated by the build processing according to the present embodiment.

A user interface in the case of enabling division execution is similar to the user interface shown in FIG. 17B, and thus the explanation will not be repeated. On the other hand, FIG. 19 shows an example of a user interface in the case of disabling division execution.

Since the execution module 91 only includes the execution code 78 of the divided and executed application program, division execution cannot be disabled without change. Therefore, the source code of the user program is interpolated by a programming tool or build processing.

Specifically, as shown in FIG. 19, when division execution is disabled, the function block 79 that uses the execution module 91 is interpreted as two function blocks 79A.

The division time 7822 of the function block 79A is set to "infinity (Inf.)." By setting the division time 7822 to "infinity," division execution is substantially disabled.

In the function block 79A, initialization of a memory or the like upon execution of the corresponding application program is instructed, and execution of all the commands included in the application program is instructed. None of values of the completion flag 7824 of the function block 79A is used (discarded).

By using such function block 79A and setting appropriate control parameters for each function block 79A, an operation equivalent to a state in which division execution is disabled can be realized.

In this way, by leaving alone the execution module 91 itself only including the execution code 78 of the divided and executed application program and automatically complementing the source code on the calling side, the same operation as in the case where division execution is disabled can be realized.

F. Other Embodiments

In the above explanation, an example in which an execution code or an execution module is generated by performing build processing on a source code of an application program has been explained. However, the disclosure is not limited to build processing (an example of pre-compilation processing). For example, the disclosure may be realized in an interpreter execution environment for sequentially interpreting and executing a program code, or may be realized in a quasi-interpreter execution environment for converting a source code into an intermediate code in advance and sequentially interpreting the converted intermediate code.

G. Additional Remark

The present embodiment as described above includes the following technical concepts.

[Configuration 1]

A method for generating an application program included in a task to be periodically executed every fixed task cycle, the method including:

receiving input of a source code (70) of the application program; and generating an execution module (78) of the application program by adding, to the source code of the application program, a first command (784) for interrupting the application program after executing the application program for a preset time within the task cycle and resuming execution of the application program in the next task cycle.

[Configuration 2]

The method as described in Configuration 1, wherein the first command includes a command to save an execution state at a moment when the preset time elapses from the start of execution of the application program; and a command to restore the saved execution state.

[Configuration 3]

The method as described in Configuration 2, wherein the first command further includes a command for setting an interrupt timer so as to generate an interrupt event when the preset time elapses from the start of execution of the application program.

[Configuration 4]

The method as described in Configuration 2, wherein the first command further includes a command to determine whether or not the preset time has elapsed at each interruption point preset in the source code of the application program.

[Configuration 5]

The method as described in Configuration 4, further including inserting the interruption point (68) into the source code of the application program.

[Configuration 6]

The method as described in any one of Configurations 1 to 5, wherein the step of generating the execution module generates the execution module (90) including a first execution code (78) and a second execution code (74), the first execution code is generated by adding the first command (784), and the second execution code (74) is generated from the source code (70) of the application program to which the first command is not added.

[Configuration 7]

The method as described in Configuration 6, wherein the step of generating the execution module includes generating program definition information (92), in association with the execution module (90), including information indicating a state of an execution code included in the execution module.

[Configuration 8]

The method as described in any one of Configurations 1 to 7, wherein the step of generating the execution module includes further adding, to the source code (70) of the application program, a second command (782) for receiving setting of control parameters related to execution, interruption and resumption of the application program.

[Configuration 9]

The method as described in Configuration 8, wherein the control parameters include information (7820) for selecting either to resume from a point where execution of the application program was interrupted or to execute the application program from the beginning.

[Configuration 10]

The method as described in Configuration 8 or 9, further including changing whether or not to enable receipt of the setting of the control parameters in a process of creating a user program referring to the execution module according to whether or not a function of interrupting the application program after executing the application program for the preset time within the task cycle is enabled.

[Configuration 11]

An apparatus for generating an application program included in a task to be periodically executed every fixed task cycle, the apparatus including:

a unit receiving input of a source code of the application program; and a unit generating an execution module (78) of the application program by adding, to the source code (70) of the application program, a first command (784) for interrupting the application program after executing the application program for a preset time within the task cycle and resuming execution of the application program in the next task cycle.

[Configuration 12]

A program for a computer to generate an application program included in a task to be periodically executed every fixed task cycle, the program causing the computer to execute:

receiving input of a source code (70) of the application program; and generating an execution module (78) of the application program by adding, to the source code of the application program, a first command (784) for interrupting the application program after executing the application program for a preset time within the task cycle and resuming execution of the application program in the next task cycle.

According to the present embodiment, an embodiment can be provided in which, even in the case where an application program whose execution is not completed within a predetermined task cycle is registered as a task to be periodically executed, a single execution may extend over a plurality of task cycles while the execution is interrupted after a preset time within each task cycle. Since there is no need to manually change a source of the application program and such execution over a plurality of task cycles can be realized, an arbitrary application program can be executed on the control apparatus, and the function of the control apparatus can be improved.

The embodiments disclosed herein are examples in all aspects and should not be interpreted as limitations. The scope of the disclosure is defined by claims instead of the above descriptions, and it is intended to include all modifications within the scope of the claims and the equivalents thereof.

What is claimed is:

1. A method for generating an application program comprised in a task to be periodically executed every fixed task cycle, the method comprising:

receiving input of a source code of the application program; and generating an execution module of the application program by adding, to the source code of the application program, a first command for interrupting the application program after executing the application program for a preset time within a task cycle and resuming execution of the application program in a next task cycle, wherein the preset time is a set division time allocated from a start of execution of the application program to interruption in the task cycle and the task cycle is a control cycle in which the application program is periodically executed from beginning to end; and wherein the first command comprises:

a command to save an execution state at a moment when the preset time elapses from the start of execution of the application program; and a command to restore the saved execution state in a subsequent task cycle, and wherein the first command further comprises a command for setting an interrupt timer so as to generate an interrupt event when the preset time elapses from the start of execution of the application program within the task cycle.

2. The method according to claim 1, wherein the first command further comprises a command to determine whether or not the preset time has elapsed at each interruption point preset in the source code of the application program.

3. The method according to claim 2, further comprising:

inserting the interruption point into the source code of the application program.

4. The method according to claim 1, wherein the step of generating the execution module generates the execution module comprising a first execution code and a second execution code, the first execution code is generated by adding the first command, and the second execution code is generated from the source code of the application program to which the first command is not added.

5. The method according to claim 2, wherein the step of generating the execution module generates the execution module comprising a first execution code and a second execution code, the first execution code is generated by adding the first command, and the second execution code is generated from the source code of the application program to which the first command is not added.

6. The method according to claim 3, wherein the step of generating the execution module generates the execution module comprising a first execution code and a second execution code, the first execution code is generated by adding the first command, and the second execution code is generated from the source code of the application program to which the first command is not added.

7. The method according to claim 4, wherein the step of generating the execution module comprises:

generating program definition information, in association with the execution module, comprising information indicating a state of an execution code comprised in the execution module.

8. The method according to claim 1, wherein the step of generating the execution module comprises:

further adding, to the source code of the application program, a second command for receiving setting of control parameters related to execution, interruption and resumption of the application program.

9. The method according to claim 2, wherein the step of generating the execution module comprises:

further adding, to the source code of the application program, a second command for receiving setting of control parameters related to execution, interruption and resumption of the application program.

10. The method according to claim 3, wherein the step of generating the execution module comprises:
further adding, to the source code of the application program, a second command for receiving setting of control parameters related to execution, interruption and resumption of the application program.

11. The method according to claim 8, wherein the control parameters comprise information for selecting either to resume from a point where execution of the application program was interrupted or to execute the application program from the beginning.

12. The method according to claim 8, further comprising:
changing whether or not to enable receipt of the setting of the control parameters in a process of creating a user program referring to the execution module according to whether or not a function of interrupting the application program after executing the application program for the preset time within the task cycle is enabled.

13. An apparatus for generating an application program comprised in a task to be periodically executed every fixed task cycle, the apparatus comprising:
a processor, being configured to:
receive input of a source code of the application program; and
generate an execution module of the application program by adding, to the source code of the application program, a first command for interrupting the application program after executing the application program for a preset time within a task cycle and resuming execution of the application program in a next task cycle,
wherein the preset time is a set division time allocated from a start of execution of the application program to interruption in the task cycle and the task cycle is a control cycle in which the application program is periodically executed from beginning to end; and
wherein the first command comprises:
a command to save an execution state at a moment when the preset time elapses from the start of execution of the application program; and
a command to restore the saved execution state in a subsequent task cycle, and wherein the first command further comprises a command for setting an interrupt timer so as to generate an interrupt event when the preset time elapses from the start of execution of the application program within the task cycle.

14. A non-transitory computer readable medium storing a program that causes a computer to generate an application program comprised in a task to be periodically executed every fixed task cycle, the program causing the computer to execute:
receiving input of a source code of the application program; and
generating an execution module of the application program by adding, to the source code of the application program, a first command for interrupting the application program after executing the application program for a preset time within a task cycle and resuming execution of the application program in a next task cycle,
wherein the preset time is a set division time allocated from a start of execution of the application program to interruption in the task cycle and the task cycle is a control cycle in which the application program is periodically executed from beginning to end; and
wherein the first command comprises:
a command to save an execution state at a moment when the preset time elapses from the start of execution of the application program; and
a command to restore the saved execution state in a subsequent task cycle, and wherein the first command further comprises a command for setting an interrupt timer so as to generate an interrupt event when the preset time elapses from the start of execution of the application program within the task cycle.

* * * * *